United States Patent
Li et al.

(10) Patent No.: US 12,307,958 B2
(45) Date of Patent: May 20, 2025

(54) POWER SUPPLY CIRCUIT WITH FIRST AND SECOND POWER SUPPLY MODULES AND A DRIVING MODULE, AND ASSOCIATED DRIVING AND DISPLAY APPARATUSES

(71) Applicant: Honor Device Co., Ltd., Shenzhen (CN)

(72) Inventors: Bowen Li, Shenzhen (CN); Weiliang Duan, Shenzhen (CN); Yan Li, Shenzhen (CN); Chen Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/792,981

(22) PCT Filed: Jan. 13, 2022

(86) PCT No.: PCT/CN2022/071794
§ 371 (c)(1),
(2) Date: Jul. 14, 2022

(87) PCT Pub. No.: WO2022/252627
PCT Pub. Date: Dec. 8, 2022

(65) Prior Publication Data
US 2024/0144869 A1    May 2, 2024

(30) Foreign Application Priority Data

Jun. 3, 2021    (CN) .......................... 202110620650.6

(51) Int. Cl.
*G09G 3/3225*    (2016.01)

(52) U.S. Cl.
CPC ... *G09G 3/3225* (2013.01); *G09G 2310/0248* (2013.01); *G09G 2330/026* (2013.01); *G09G 2330/027* (2013.01); *G09G 2330/028* (2013.01)

(58) Field of Classification Search
CPC .................................................. G09G 3/3225
See application file for complete search history.

(56) References Cited

U.S. PATENT DOCUMENTS 10,157,574 B2    12/2018  Park et al.
2009/0109147 A1*  4/2009  Park ..................... G09G 3/3233
                                                            345/76

(Continued)

FOREIGN PATENT DOCUMENTS

CN    104882111 A    9/2015
CN    105427828 A    3/2016

(Continued)

*Primary Examiner* — William Boddie
*Assistant Examiner* — Andrew B Schnirel
(74) *Attorney, Agent, or Firm* — Conley Rose, P.C.

(57) ABSTRACT

A power supply circuit includes: a first power supply module and a second power supply module. An output end of the first power supply module is connected to a first output end of the second power supply module, and is configured to be connected to a first input end of the driving module. An output end of the first power supply module is configured to output a first voltage signal, and a first output end of the second power supply module is configured to output a second voltage signal. A second output end of the second power supply module is configured to be connected to a second input end of the driving module, so as to output a third voltage signal. The voltage signals are used to instruct the driving module to generate a gate turn-on signal.

20 Claims, 18 Drawing Sheets

(56) References Cited

U.S. PATENT DOCUMENTS

| | | |
|---|---|---|
| 2011/0141091 A1 | 6/2011 | Eom |
| 2011/0175880 A1* | 7/2011 | Lee .................. G09G 3/3225 345/76 |
| 2012/0044231 A1* | 2/2012 | Park .................. G06F 1/263 345/211 |
| 2015/0015564 A1 | 1/2015 | Yamagishi |
| 2018/0082653 A1 | 3/2018 | Wang et al. |

FOREIGN PATENT DOCUMENTS

| | | |
|---|---|---|
| CN | 106157915 A | 11/2016 |
| CN | 206932170 U | 1/2018 |
| CN | 208986673 U | 6/2019 |
| IN | 106847200 A | 6/2017 |
| IN | 113436563 A | 9/2021 |
| KR | 20190045661 A | 5/2019 |
| KR | 20200061121 A | 6/2020 |
| TW | 201023153 A | 6/2010 |

\* cited by examiner

POWER SUPPLY CIRCUIT WITH FIRST AND SECOND POWER SUPPLY MODULES AND A DRIVING MODULE, AND ASSOCIATED DRIVING AND DISPLAY APPARATUSES

CROSS-REFERENCE TO RELATED APPLICATIONS

This application is a U.S. National Stage of International Application No. PCT/CN2022/071794 filed on Jan. 13, 2022, which claims priority to Chinese Patent Application No. 202110620650.6, filed with the China National Intellectual Property Administration on Jun. 3, 2021, both of which are incorporated herein by reference in their entireties.

TECHNICAL FIELD

This application relates to the field of display technologies, and in particular, to a power supply circuit, a driving apparatus, and a display apparatus.

BACKGROUND

A display apparatus includes a power supply circuit, a driving module, and a display panel. The power supply circuit includes a first power supply module and a second power supply module. When the display panel needs to display an image, the first power supply module outputs a VCI signal to the driving module. When receiving the VCI signal, the driving module triggers the second power supply module to work. When working, the second power supply module outputs an ELVDD signal and an ELVSS signal to the display panel, and outputs an AVDD signal to the driving module. The driving module generates a VGH signal based on the AVDD signal and the VCI signal, generates a data signal based on an image that needs to be displayed, and outputs both the VGH signal and the data signal to the display panel, so that the display panel displays the image.

In the related art, when a voltage drop of a conducting wire is not considered, a voltage of the VGH signal is equal to a sum of a voltage of the AVDD signal and a voltage of the VCI signal. Therefore, the voltage of the VGH signal is low and cannot meet a high refresh rate requirement of the display panel.

SUMMARY

This application provides a power supply circuit, a driving apparatus, and a display apparatus, so as to resolve a problem in a related art that a voltage of a VGH signal is low and cannot meet a high refresh frequency requirement of a display panel. The technical solutions are as follows:

According to a first aspect, a power supply circuit is provided, including: a first power supply module and a second power supply module. An output end of the first power supply module is connected to a first output end of the second power supply module, and both the output end of the first power supply module and the first output end of the second power supply module are configured to be connected to a first input end of the driving module. A second output end of the second power supply module is configured to be connected to a second input end of the driving module. When the first power supply module works and the second power supply module sleeps, the output end of the first power supply module outputs a voltage signal, so as to instruct the driving module to trigger the second power supply module to work. When both the first power supply module and the second power supply module work, the output end of the first power supply module, the first output end of the second power supply module, and the second output end of the second power supply module all output voltage signals, so as to instruct the driving module to generate a gate turn-on signal that is used to drive a switching transistor in the display panel to turn on. A voltage of the voltage signal output by the output end of the first power supply module is lower than a voltage of the voltage signal output by the first output end of the second power supply module.

In this application, when the first power supply module works and the second power supply module sleeps, the voltage signal output by the output end of the first power supply module is used to instruct the driving module to trigger the second power supply module to work. When both the first power supply module and the second power supply module work, the output end of the first power supply module, the first output end of the second power supply module, and the second output end of the second power supply module all output voltage signals, so as to instruct the driving module to generate a gate turn-on signal that is used to drive a switching transistor in the display panel to turn on. A voltage of the voltage signal output by the first output end of the second power supply module is higher than a voltage of a first voltage signal. In this way, when both the first power supply module and the second power supply module work, the first input end of the driving module inputs a second voltage signal, and the second input end of the driving module inputs a third voltage signal, so that the driving module may generate the gate turn-on signal based on the second voltage signal and the third voltage signal. In the related art, the driving module generates a gate turn-on signal based on the first voltage signal and the third voltage signal. Therefore, in this application, a voltage of the gate turn-on signal generated by the driving module may be increased, so that the voltage of the gate turn-on signal meets the high refresh frequency requirement of the display panel. In addition, in the power supply circuit, the first output end that is of the second power supply module and that is configured to output the second voltage signal is connected to the output end that is of the first power supply module and that is configured to output the first voltage signal, that is, a voltage value of a gate turn-on signal may be increased, and a layout area of the power supply circuit is not excessively increased, thereby facilitating cost control of the power supply circuit.

Optionally, the power supply circuit further includes a discharging module. A first end of the discharging module is connected to the output end of the first power supply module and the first output end of the second power supply module, and a second end of the discharging module is connected to a ground cable GND.

In this application, the discharging module is configured to: when the first power supply module and the second power supply module stop outputting voltage signals, quickly release a residual voltage signal in a conducting wire connected to the first input end of the driving module to the ground cable GND, so as to shorten a screen-off delay of the display apparatus to which the power supply circuit is applied.

Optionally, the discharging module includes a resistor R1. A first end of the resistor R1 is connected to the output end of the first power supply module and the first output end of the second power supply module, and a second end of the resistor R1 is connected to the ground cable GND.

Optionally, the discharging module further includes a switch unit. A first end of the switch unit is connected to a second end of the resistor R1, a second end of the switch unit is connected to a ground cable GND, a control end of the switch unit is connected to a control end of the second power supply module, and the switch unit turns off when the control end of the second power supply module outputs a voltage signal.

In this application, the switch unit is configured to control whether the resistor R1 is connected to the ground cable GND, and whether the switch unit is connected is controlled by the control end of the second power supply module. When the display apparatus to which the power supply circuit is applied needs to display an image, the switch unit may turn off, so as to prevent a voltage signal that is input to the first input end of the driving module from flowing into the ground cable GND through the resistor R1, thereby avoiding unnecessary power waste. When the display apparatus to which the power supply circuit is applied needs to stop displaying the image, the switch unit may be closed, so that the residual voltage signal in the conducting wire connected to the first input end of the driving module can be quickly released to the ground cable GND through the resistor R1 and the switch unit.

Optionally, the switch unit includes: a transistor M1, a resistor R2, and a resistor R3. A first end of the transistor M1 is connected to the second end of the resistor R1, and a second end of the transistor M1 is connected to the ground cable GND. A first end of the resistor R2 is connected to a power supply V1, and a second end of the resistor R2 is connected to a control end of the transistor M1. A first end of the resistor R3 is connected to the second end of the resistor R2, a second end of the resistor R3 is connected to the control end of the second power supply module, and when the control end of the second power supply module outputs a voltage signal, the transistor M1 turns off.

Optionally, the voltage signal output by the control end of the second power supply module is further used to drive a light emitting unit in the display panel to emit light.

In this application, the voltage signal output by the control end of the second power supply module is not only used to drive the light emitting unit in the display panel to emit light, but also used to control the transistor M1 to turn off. In this way, the transistor M1 turns off when the display apparatus needs to display an image, and turns on when the display apparatus does not need to display an image. In addition, control of the transistor M1 does not excessively increase the layout area of the power supply circuit 20, thereby facilitating cost control of the power supply circuit 20.

Optionally, the power supply circuit further includes: a first unidirectional module. An input end of the first unidirectional module is connected to the output end of the first power supply module, and an output end of the first unidirectional module is connected to the first output end of the second power supply module.

In this application, a unidirectional module refers to a circuit in which a voltage signal can only flow from an input end to an output end. The first unidirectional module can prevent the second voltage signal from flowing back to the output end of the first power supply module when the first output end of the second power supply module outputs the second voltage signal.

Optionally, the first unidirectional module includes: a diode D1. An anode of the diode D1 is connected to the output end of the first power supply module, and a cathode of the diode D1 is connected to the first output end of the second power supply module.

In this application, the diode D1 is used to form the first unidirectional module, so that the second voltage signal can be prevented from flowing back to the output end of the first power supply module. In addition, because of a low cost and a simple connection manner of the diode, using the diode to form a unidirectional module does not excessively increase the layout area of the power supply circuit, thereby facilitating cost control of the power supply circuit.

Optionally, the first unidirectional module includes: an operational amplifier A1. An in-phase input end of the operational amplifier A1 is connected to the output end of the first power supply module, and both an inverting input end of the operational amplifier A1 and an output end of the operational amplifier A1 are connected to the first output end of the second power supply module.

Optionally, the first unidirectional module includes: a unidirectional silicon controlled thyristor SCR1. Both an anode and a control grid of the unidirectional silicon controlled thyristor SCR1 are connected to the output end of the first power supply module, and a cathode of the unidirectional silicon controlled thyristor SCR1 is connected to the first output end of the second power supply module.

Optionally, the power supply circuit further includes: a second unidirectional module. An input end of the second unidirectional module is connected to the first output end of the second power supply module, and an output end of the second unidirectional module is connected to the output end of the first power supply module. The second unidirectional module can prevent the first voltage signal from flowing back to the first output end of the second power supply module when the output end of the first power supply module outputs the first voltage signal.

Optionally, the output end of the first power supply module starts to output a voltage signal at a moment T1; the second output end of the second power supply module starts to output a voltage signal after the moment T1 and before a moment T2; the first output end of the second power supply module starts to output a voltage signal at the moment T2; the first output end of the second power supply module stops outputting a voltage signal at a moment T3; the second output end of the second power supply module stops outputting a voltage signal after the moment T3 and before a moment T4; and the output end of the first power supply module stops outputting a voltage signal at the moment T4. With the power supply circuit, a time sequence of the power supply circuit does not need to be changed, so that the voltage of the gate turn-on signal can be increased, thereby facilitating cost control of the power supply circuit.

Optionally, a third output end of the second power supply module starts to output a voltage signal at a moment T21, and the voltage signal output by the third output end of the second power supply module is used to drive the light emitting unit in the display panel to emit light; and the T21 moment and the moment T2 are a same moment, or the T21 moment is after the moment T2 and before the moment T3. The third output end of the second power supply module stops outputting a voltage signal at a moment T22, where the T22 moment and the moment T3 are a same moment, or the T22 moment is after the T21 moment and before the moment T3.

The voltage signal output by the third output end of the second power supply module is used to drive the light emitting unit in the display panel to emit light. In other words, the third output end of the second power supply module is a control end of the second power supply module.

The third output end of the second power supply module is configured to output a fourth voltage signal.

According to a second aspect, a driving apparatus is provided, including a driving module and the power supply circuit according to the first aspect. The driving module is configured to: when a voltage signal is input to a first input end of the driving module and no voltage signal is input to a second input end of the driving module, trigger a second power supply module to work; and when voltage signals are input to both the first input end and the second input end of the driving module, generate a gate turn-on signal when based on the voltage signals input to both the first input end and the second input end of the driving module, where the gate turn-on signal is used to drive a switching transistor in the display panel to turn on.

According to a third aspect, a display apparatus is provided, including a display panel and the driving apparatus according to the second aspect.

The technical effects obtained in the second aspect and the third aspect are similar to the technical effects obtained by the corresponding technical means in the first aspect, and are not described herein again.

BRIEF DESCRIPTION OF DRAWINGS

To describe technical solutions in embodiments of this application more clearly, the following briefly describes accompanying drawings required for describing the embodiments of this application or the prior art.

Figure 1:
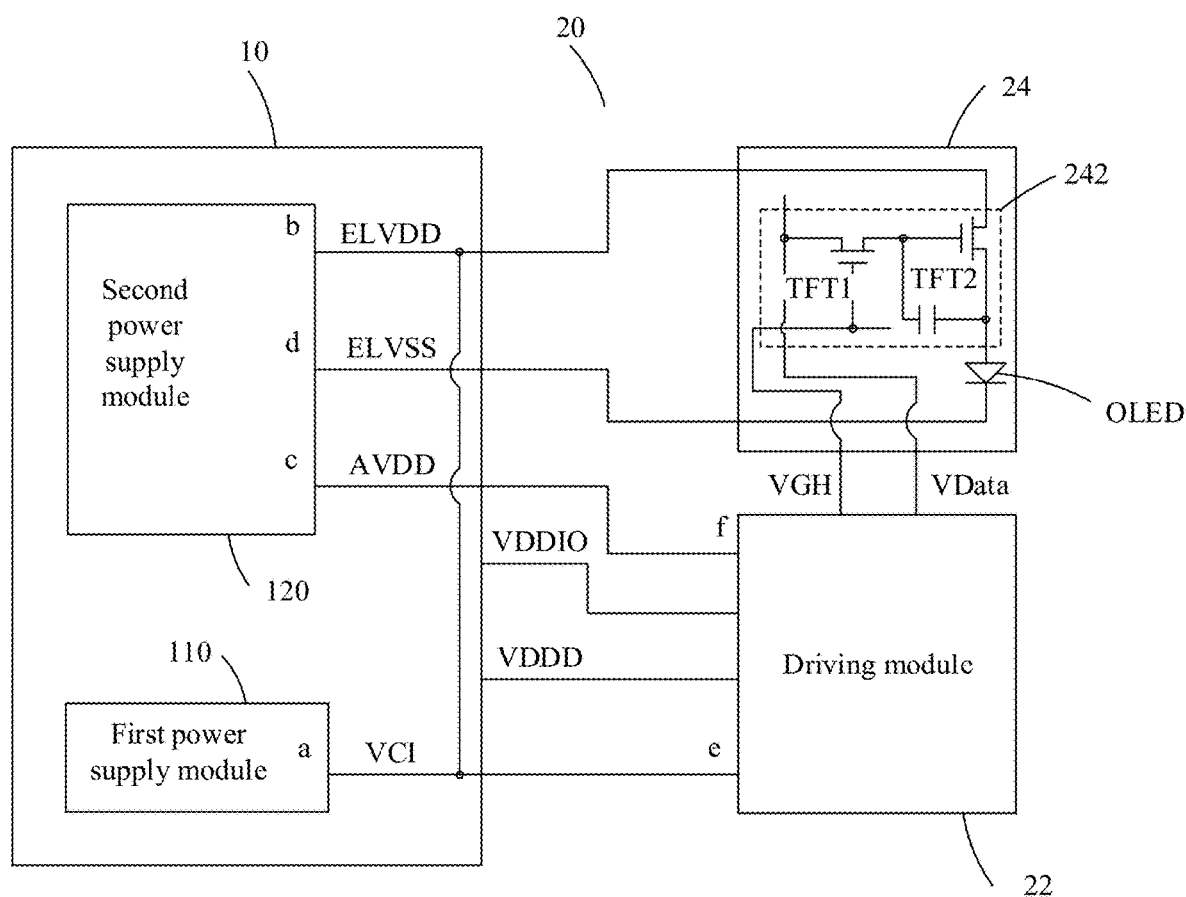
FIG. 1 is a schematic diagram of a structure of a first display apparatus according to an embodiment of this application.
Figure 2:
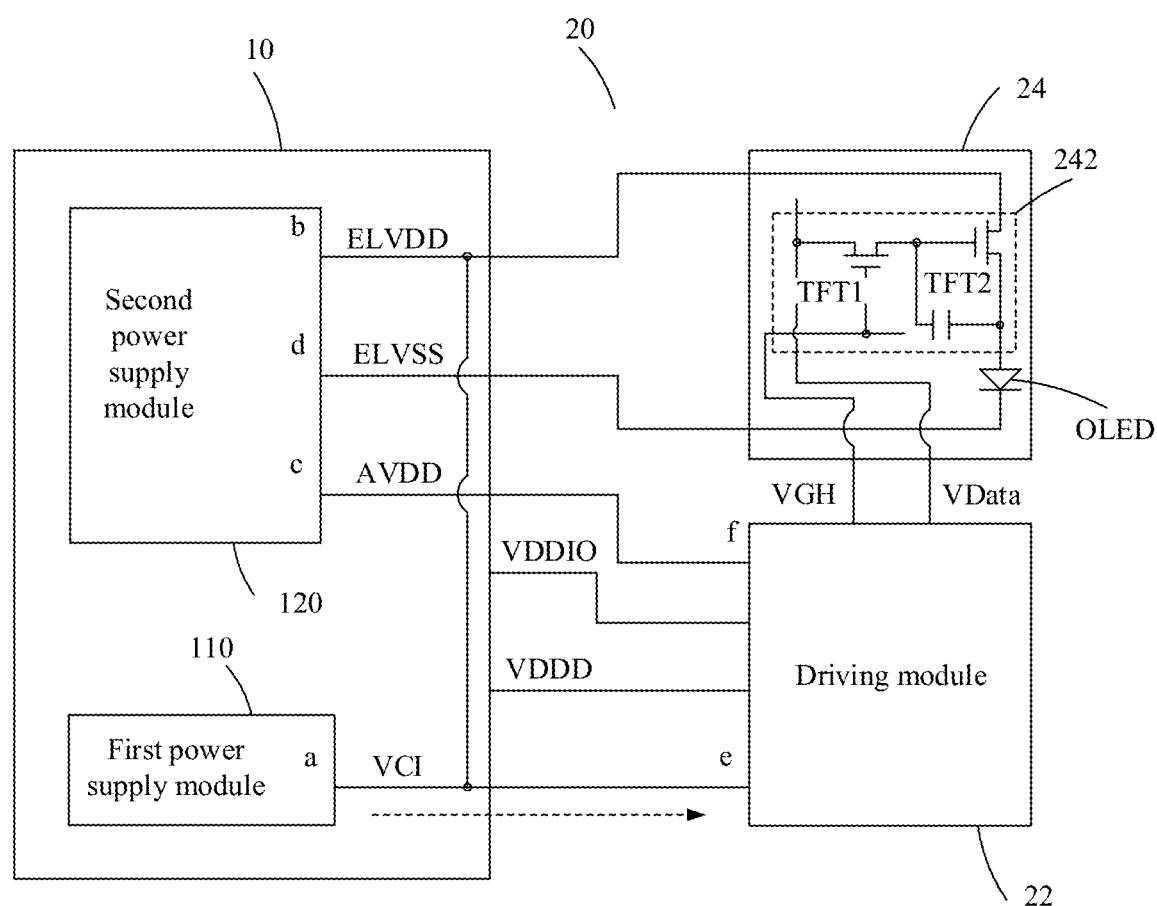
FIG. 2 is a partial current flow diagram of a first display apparatus according to an embodiment of this application.

Meanings represented by the reference numerals of the accompanying drawings are respectively as follows:

10. Power supply circuit;
110. First power supply module;
120. Second power supply module;
20. Display apparatus;
22. Driving module;
24. Display panel;
242. Pixel circuit;
130. Discharging module;
132. Switch unit;
140. First unidirectional module;
150. Second unidirectional module.

DESCRIPTION OF EMBODIMENTS

To make the objectives, technical solutions, and advantages of this application clearer, the following further describes embodiments of this application in detail with reference to the accompanying drawings.

It should be understood that "a plurality of" mentioned in this application means two or more. In the descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in the embodiments of this application, terms such as "first" and "second", are used in the embodiments of this application to distinguish the same or similar items with substantially the same function and effect. Persons skilled in the art may understand that the terms such as "first" and "second" are not intended to limit a quantity or an execution sequence; and the terms such as "first" and "second" do not indicate a definite difference.

The following describes in detail a power supply circuit, a driving apparatus, and a display apparatus that are provided in the embodiments of this application. In each embodiment of this application, a connection between two electronic devices refer to an electrical connection, and the electrical connection herein means that the two electronic devices are connected by using a wire or in a wireless manner to transmit electrical signals.

Embodiment 1

FIG. 1 is a schematic diagram of a structure of a display apparatus 20 including a power supply circuit 10 according to an embodiment of this application. Referring to FIG. 1, the display apparatus 20 includes the power supply circuit 10, a driving module 22, and a display panel 24.

The display panel 24 includes a plurality of pixel circuits 242 and a plurality of light emitting units OLEDs (only one is shown in the figure). The plurality of pixel circuits 242 are in a one-to-one correspondence with the plurality of light emitting units OLEDs. Each pixel circuit 242 is configured to drive a corresponding light emitting unit OLED to emit light, and each light emitting unit OLED is a sub-pixel on the display panel 24. The pixel circuit 242 includes a switching transistor TFT1 and a driving transistor TFT2.

When the display apparatus 20 works, voltage signals that need to be output by the power supply circuit 10 include an ELVDD signal, an ELVSS signal, an AVDD signal, a VDDIO signal, a VDDD signal, and a VCI signal. The ELVDD signal, the ELVSS signal, the AVDD signal, and the VCI signal are analog signals, and the VDDIO signal and the VDDD signal are digital signals. For example, a voltage of the ELVDD signal is generally 4.6 V; a voltage of the ELVSS signal is generally from −2.3 V to −4.6 V; a voltage of the AVDD signal is generally 7.6 V; a voltage of the VCI signal is generally 3 V; a voltage of the VDDIO signal is generally 1.8 V; and a voltage of the VDDD signal is generally 1.2 V.

The power supply circuit 10 includes a first power supply module 110 and a second power supply module 120. The first power supply module 110 may be a power management chip, for example, may be a power management unit (power management unit, PMU). The first power supply module 110 includes an output end a configured to output a voltage signal. The second power supply module 120 may also be a power supply management chip, for example, may be a PMU. The second power supply module 120 includes a first output end b, a second output end c, and a third output end d that are configured to output voltage signals. For ease of description, a voltage signal output by the output end a of the first power supply module 110 when the first power supply module 110 works is referred to as a first voltage signal; and a voltage signal output by the first output end b of the second power supply module 120 when the second power supply module 120 works is referred to as a second voltage signal, a voltage signal output by the second output end c of the second power supply module 120 is referred to as a third voltage signal, and a voltage signal output by the third output end d of the second power supply module 120 is referred to as a fourth voltage signal. A voltage of the second voltage signal is higher than a voltage of the first voltage signal.

The output end a of the first power supply module 110 is connected to the first output end b of the second power supply module 120, and is configured to be connected to the first input end e of the driving module 22. In other words, the output end a of the first power supply module 110 is configured to be connected to the first input end e of the driving module 22, so that when the output end a of the first power supply module 110 outputs the first voltage signal, the first voltage signal may be input to the first input end e of the driving module 22. The first output end b of the second power supply module 120 is also configured to be connected to the first input end e of the driving module 22, so that when the first output end b of the second power supply module 120 outputs the second voltage signal, the second voltage signal may also be input to the first input end e of the driving module 22. The second output end c of the second power supply module 120 is configured to be connected to the second input end f of the driving module 22, so that when the second output end c of the second power supply module 120 outputs the third voltage signal, the third voltage signal may be input to the second input end f of the driving module 22. The first output end b of the second power supply module 120 is further configured to be connected to an anode of the light emitting unit OLED in the display panel 24, so that the second voltage signal output by the first output end b of the second power supply module 120 may be input to the anode of the light emitting unit OLED. The third output end d of the second power supply module 120 is also configured to be connected to a cathode of the light emitting unit OLED in the display panel 24, so that when the third output end d of the second power supply module 120 outputs the fourth voltage signal, the fourth voltage signal may be input to the cathode of the light emitting unit OLED.

When the first power supply module 110 works and the second power supply module 120 sleeps, the first voltage signal output by the output end a of the first power supply module 110 is used to instruct the driving module 22 to trigger the second power supply module 120 to work. That is, the first voltage signal is a VCI signal. In the following description, the first voltage signal output by the output end a of the first power supply module 110 is referred to as a "first voltage signal VCI". The third voltage signal output by the second output end c of the second power supply module 120 is input to the second input end f of the driving module 22, which is different from the input of the first voltage signal VCI to the first input end e of the driving module 22. The voltage signal is an AVDD signal. The voltage of the second voltage signal is higher than the voltage of the first voltage signal, that is, the second voltage signal is an ELVDD signal. In the following description, the second voltage signal output by the first output end b of the second power supply module 120 is referred to as a "second voltage signal ELVDD", and the third voltage signal output by the second output end c of the second power supply module 120 is referred to as a "third voltage signal AVDD". The second voltage signal ELVDD is a positive voltage signal that is input to a positive electrode of the light emitting unit OLED in the display panel 24. The fourth voltage signal is an ELVSS signal. In the following description, the fourth voltage signal output by the third output end d of the second power supply module 120 is referred to as a "fourth voltage signal ELVSS". The fourth voltage signal ELVSS is a negative voltage signal that is input to a negative electrode of the light emitting unit OLED in the display panel 24.

The driving module 22 may be a driving chip, such as a timing control chip. The driving module 22 is configured to: when a voltage signal is input to the first input end e of the driving module 22 and no voltage signal is input to the second input end f of the driving module 22, trigger the second power supply module 120 to work; and when voltage signals are input to both the first input end e and the second input end f of the driving module 22, generate a gate turn-on signal based on the voltage signals input to both the first input end e and the second input end f of the driving module 22. The gate turn-on signal is used to drive the switching transistor TFT1 in the display panel 24 to turn on, that is, the gate turn-on signal is a VGH signal. Similarly, in the following description, the gate turn-on signal is referred to as a "gate turn-on signal VGH".

A working process of the display apparatus 20 is as follows:

When the display panel 24 does not display an image, both the first power supply module 110 and the second power supply module 120 are in a sleep state. When the display panel 24 needs to display an image, as shown in FIG.

2, the first power supply module 110 first works, and the output end a of the first power supply module 110 outputs the first voltage signal VCI to the first input end e of the driving module 22. When receiving the first voltage signal VCI, the driving module 22 triggers the second power supply module 120 to work. In this case, both the first power supply module 110 and the second power supply module work.

Figure 3:
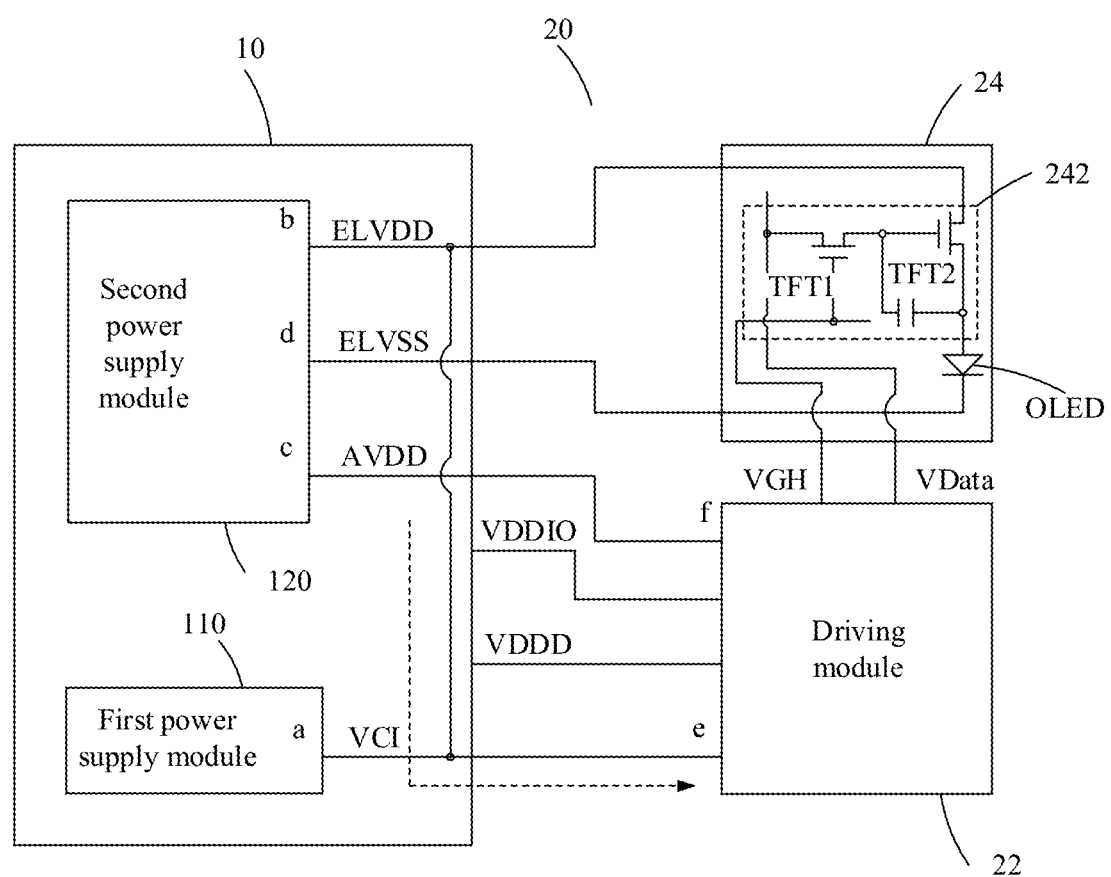
FIG. 3 is a partial current flow diagram of a second display apparatus according to an embodiment of this application.

When both the first power supply module 110 and the second power supply module work, the first output end b of the second power supply module 120 outputs the second voltage signal ELVDD to the display panel 24, and the first output end b of the second power supply module 120 outputs the second voltage signal ELVDD to the first input end e of the driving module 22, as shown in FIG. 3; and the second output end c of the second power supply module 120 outputs the third voltage signal AVDD to the second input end f of the driving module 22, and the third output end d of the second power supply module 120 outputs the fourth voltage signal ELVSS to the display panel 24. In this case, voltage signals are input to both the first input end e and the second input end f of the driving module 22.

The driving module 22 generates the gate turn-on signal VGH based on the voltage signal input by the first input end e of the driving module 22 and the voltage signal input to the second input end f of the driving module 22, where the voltage of the gate turn-on signal VGH is positively correlated with a voltage of the voltage signal input to the first input end e of the driving module 22, and the voltage of the gate turn-on signal VGH is positively correlated with a voltage of the voltage signal input to the second input end f of the driving module 22. When generating the gate turn-on signal VGH, the driving module 22 further generates a data signal VData based on an image that needs to be displayed. The data signal VData is used to drive the driving transistor TFT2 in the display panel 24 to turn on. Both the gate turn-on signal VGH and the data signal VData are transmitted to the display panel 24.

The VGH signal generated by the driving module 22 is transmitted to a control end of the switching transistor TFT1, so as to control the switching transistor TFT1 to turn on. After the switching transistor TFT1 turns on, the VData signal generated by the driving module 22 is transmitted to a control end of the driving transistor TFT2 by using the switching transistor TFT1, so as to control the driving transistor TFT2 to turn on. After the driving transistor TFT2 turns on, the ELVDD signal output by the second power supply module 124 is transmitted to the anode of the light emitting unit OLED by using the driving transistor TFT2, and the ELVSS signal output by the second power supply module 124 is transmitted to the cathode of the light emitting unit OLED, so that the light emitting unit OLED emits light. In this case, the display panel 24 displays an image.

Generally, the voltage of the gate turn-on signal VGH generated by the driving module 22 is equal to a sum of the voltage of the voltage signal input to the first input end e of the driving module 22 and the voltage of the voltage signal input to the second input end f of the driving module 22. The driving module 22 generates the gate turn-on signal VGH when both the first power supply module 110 and the second power supply module 120 work. When the second power supply module 120 works, the first output end b of the second power supply module 120 outputs the second voltage signal ELVDD to the first input end e of the driving module 22, and the second output end c of the second power supply module 120 outputs the third voltage signal AVDD to the second input end f of the driving module 22. In this case, because a voltage of the second voltage signal ELVDD is higher than a voltage of the first voltage signal VCI, the voltage signals output by the output end a of the first power supply module 110 and the first output end b of the second power supply module 120 to the first input end e of the driving module 22 are the second voltage signals ELVDDs, and the voltage signal output by the second output end c of the second power supply module 120 to the second input end f of the driving module 22 is the third voltage signal AVDD. When voltage signals are input to both the first input end e and the second input end f of the driving module 22, the driving module 22 generates the gate turn-on signal VGH based on the voltage signals input to the first input end e and the second input end f of the driving module 22. That is, the driving module 22 generates the gate turn-on signal VGH based on the second voltage signal ELVDD and the third voltage signal AVDD. In the related art, the voltage of the gate turn-on signal VGH generated by the driving module 22 is equal to a sum of the voltage of the first voltage signal VCI and the voltage of the third voltage signal AVDD. However, in this embodiment of this application, the voltage of the gate turn-on signal VGH generated by the driving module 22 is equal to a sum of the voltage of the second voltage signal ELVDD and the voltage of the third voltage signal AVDD. Therefore, in this embodiment of this application, the voltage of the gate turn-on signal VGH is increased, thereby helping meet the high refresh frequency requirement of the display panel 24. In addition, in this embodiment of this application, the first output end of the second power supply module 120 in the power supply circuit 10 that is configured to output the second voltage signal ELVDD is connected to the output end of the first power supply module 110 that is configured to output the first voltage signal VCI, so that the voltage of the gate turn-on signal VGH can be increased, and the layout area of the power supply circuit 10 is not excessively increased, thereby facilitating cost control of the power supply circuit 10.

Embodiment 2

In a process of displaying an image by the display apparatus 20, when the display apparatus 20 receives a screen-off instruction sent by a user, the display panel 24 needs to quickly stop displaying the image. Generally, when the display apparatus 20 receives the screen-off instruction sent by the user, the first power supply module 110 and the second power supply module 120 stop outputting a voltage signal, but a conducting wire connected to the first input end e of the driving module 22 (including a conducting wire connected between the first input end e of the driving module 22 and the output end a of the first power supply module 110, and a conducting wire connected between the output end a of the first power supply module 110 and the first output end b of the second power supply module 120) still has a residual voltage signal. The driving module 22 may continue to generate the gate turn-on signal VGH based on the residual voltage signal, so that the display apparatus 20 has a relatively long screen-off delay. The screen-off delay refers to duration from a time when the display apparatus 20 receives the screen-off instruction to a time when the display panel 24 of the display apparatus 20 completely stops displaying the image.

Figure 4:
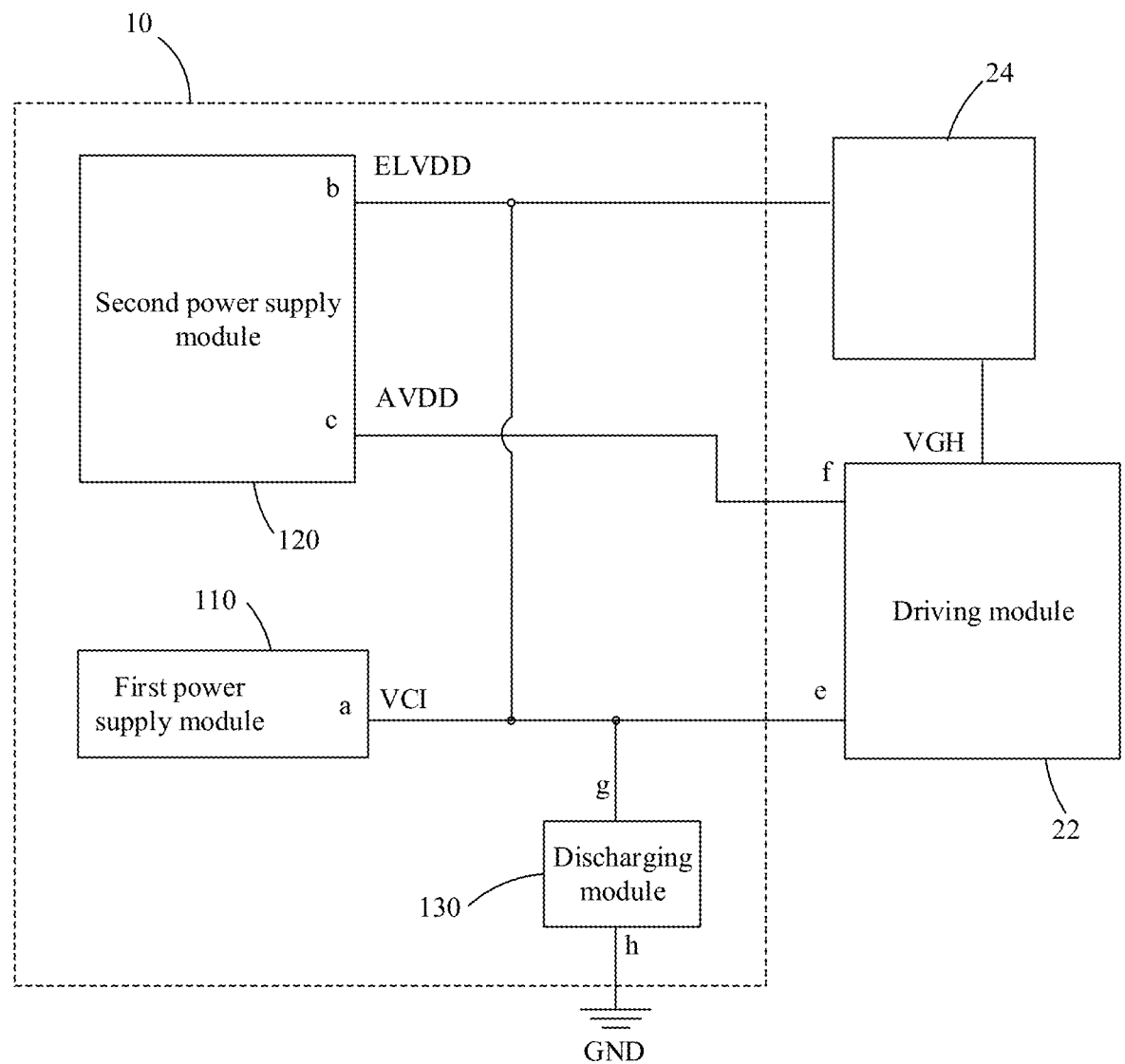
FIG. 4 is a schematic diagram of a structure of a first power supply circuit according to an embodiment of this application.

To shorten the screen-off delay of the display apparatus 20, as shown in FIG. 4, the power supply circuit 10 may further include a discharging module 130. A first end g of the discharging module 130 is connected to the output end a of the first power supply module 110 and the first end b of the second power supply module 120, and a second end h of the discharging module 130 is connected to the ground cable GND. The discharging module 130 is configured to: when the first power supply module 110 and the second power supply module 120 stop outputting the voltage signal, quickly release the residual voltage signal in the wires connected to the first input end e of the driving module 22 to the ground cable GND, so as to shorten the screen-off delay of the display apparatus 20.

With reference to a specific embodiment, the following describes a plurality of different implementations of the discharging module 130.

Figure 5:
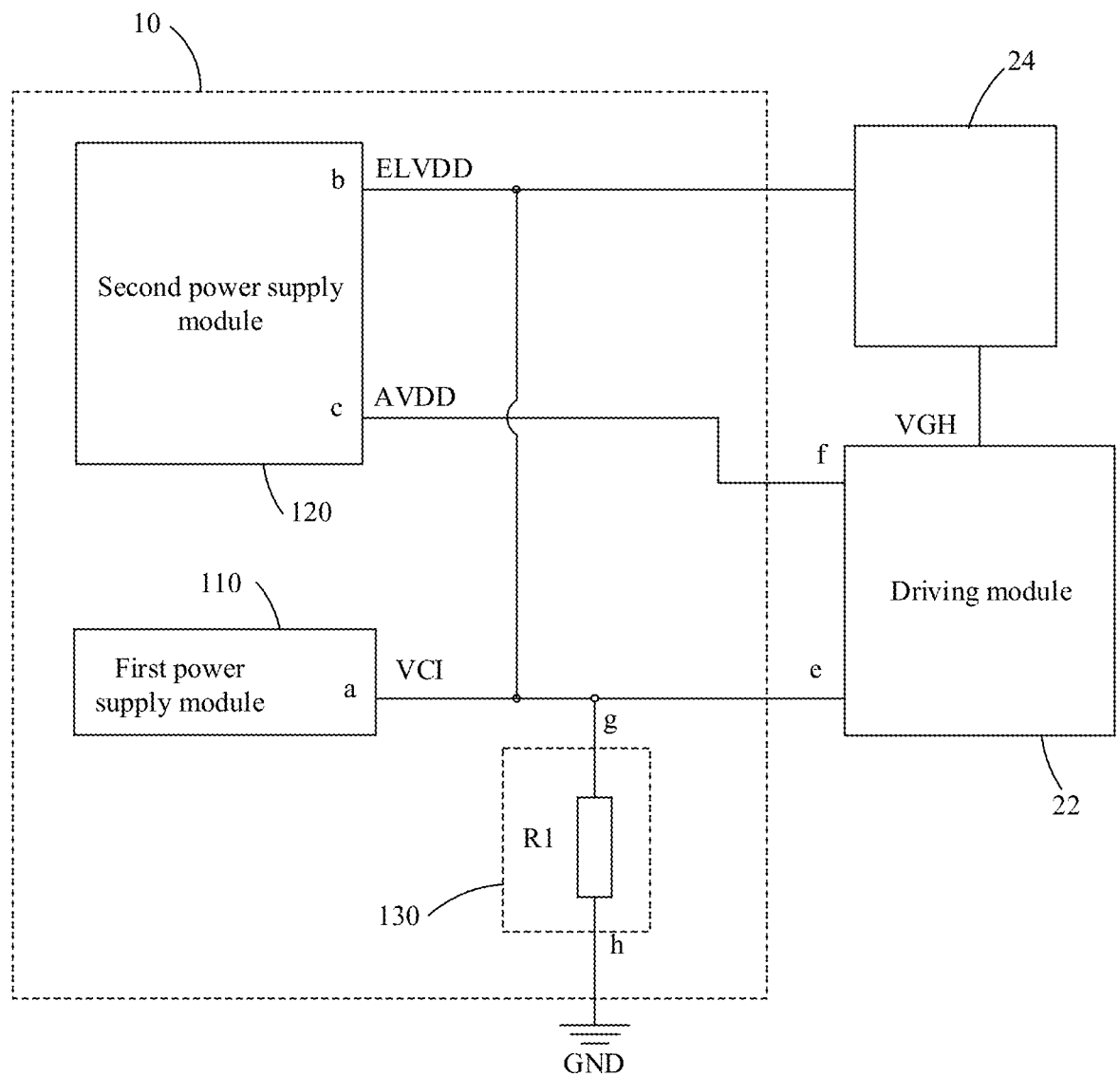
FIG. 5 is a schematic diagram of a structure of a second power supply circuit according to an embodiment of this application.

In a first possible implementation, as shown in FIG. 5, the discharging module 130 includes a resistor R1. A first end of the resistor R1 is configured to be connected to the output end a of the first power supply module 110 and the first output end b of the second power supply module 120, and a second end of the resistor R1 is connected to the ground cable GND.

In this way, when the display apparatus 20 to which the power supply circuit 10 is applied receives the screen-off instruction, and the first power supply module 110 and the second power supply module 120 stop outputting the voltage signal, the residual voltage signal in the conducting wire connected to the first input end e of the driving module 22 can be quickly released to the ground cable GND through the resistor R1.

Figure 6:
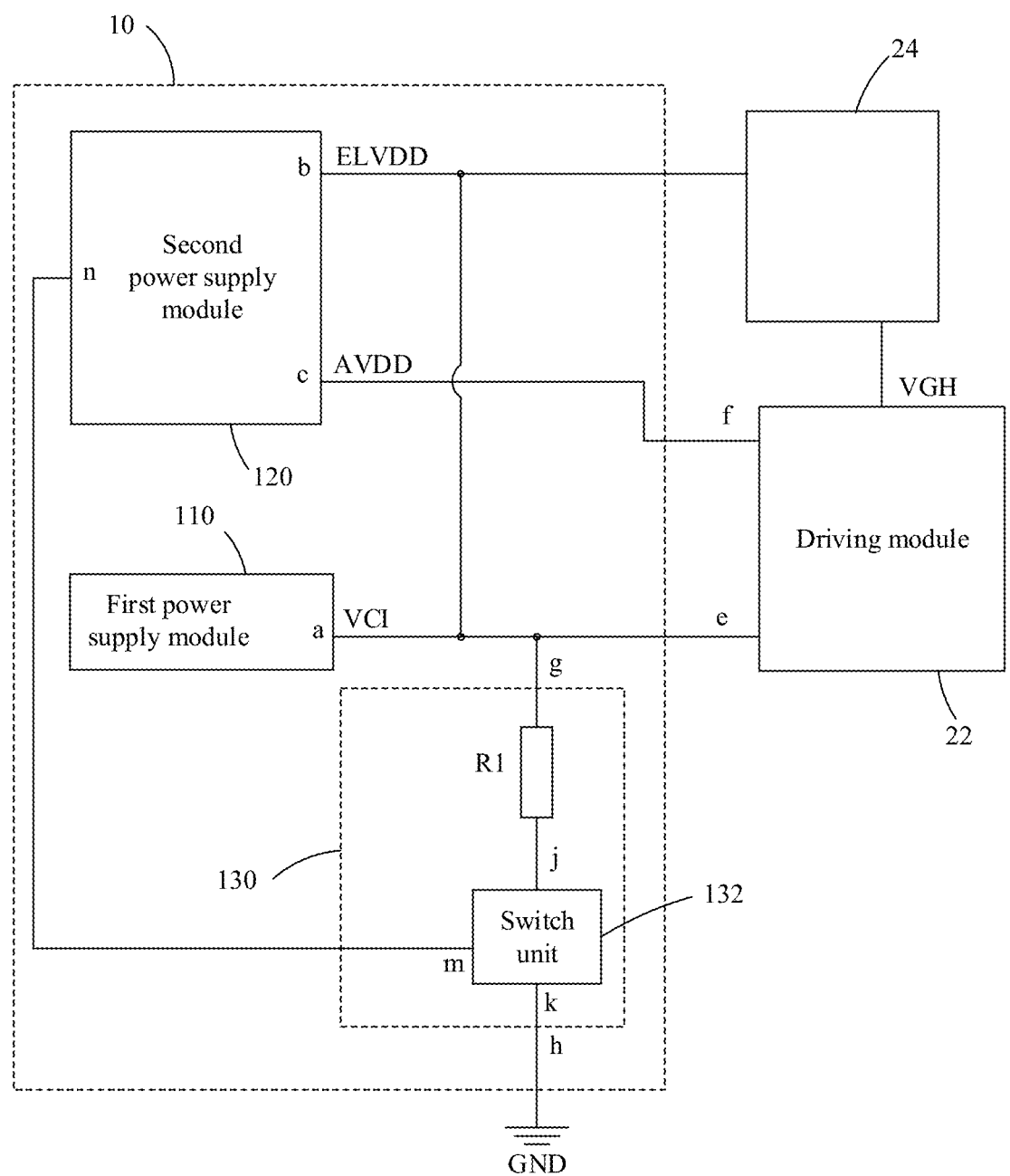
FIG. 6 is a schematic diagram of a structure of a third power supply circuit according to an embodiment of this application.

In a second possible implementation, as shown in FIG. 6, the discharging module 130 includes a resistor R1 and a switch unit 132. The resistor R1 and the switch unit 132 are connected in series to form a discharging module 130. A first end of the resistor R1 is connected to the output end a of the first power supply module 110 and the first output end b of the second power supply module 120, a second end of the resistor R1 is connected to a first end j of the switch unit 132, and a second end k of the switch unit 132 is connected to the ground cable GND.

In this way, whether the resistor R1 is connected to the ground cable can be controlled by using the switch unit 132. When the switch unit 132 is closed and the first end j and the second end k of the switch unit 132 are connected, the resistor R1 is connected to the ground cable GND by using the switch unit 132. On the contrary, when the switch unit 132 turns off and the first end j and the second end k of the switch unit 132 are not connected, the resistor R1 is disconnected from the ground cable GND.

A control end m of the switch unit 132 is connected to a control end n of the second power supply module 120, so that the second power supply module 120 can control the switch unit 132 to turn on or off. When the display apparatus 20 needs to display an image, a voltage signal needs to be input to the first input end e of the driving module 22 needs to input a voltage signal. In this case, the control end n of the second power supply module 120 may control the switch unit 132 to turn off, so as to prevent a voltage signal that is input to the first input end of the driving module 22 from flowing into the ground cable GND through the resistor R1, thereby avoiding unnecessary power waste. When the display apparatus 20 needs to stop displaying the image, a voltage signal no longer needs to be input to the first input end e of the driving module 22. In this case, the control end n of the second power supply module 120 may control the switch unit 132 to be closed, so that a residual voltage signal in the conducting wire connected to the first input end e of the driving module 22 can be quickly released to the ground cable GND through the resistor R1 and the switch unit 132.

The switch unit 132 may have a plurality of possible structures. The following describes three possible structures.

In a first possible structure, the switch unit 132 may include a triode, and the control end n of the second power supply module 120 may output a first level signal and a second level signal. A collector of the triode may be connected to the second end of the resistor R1, and an emitter of the triode may be connected to the ground cable GND. The base of the triode may be connected to the control end n of the second power supply module 120. The first level signal may control the switch unit 132 to turn off, and the second level signal may control the switch unit 132 to turn on.

In this way, when the display apparatus 20 needs to display an image, the control end n of the second power supply module 120 inputs the first level signal to the base of the triode, so as to control the triode to turn off. When the display apparatus 20 stops displaying the image, the control end of the second power supply module 120 inputs the second level signal to a base of the triode, so as to control the triode to turn on. When the triode is a PNP-type triode, the first level signal herein is a high-level signal, and the second level signal is a low-level signal. When the triode is an NPN-type triode, the first level signal herein is a low-level signal, and the second level signal is a high-level signal.

In a second possible structure, the switch unit 132 may include a unidirectional silicon controlled thyristor. An anode of the unidirectional silicon controlled thyristor may be connected to the second end of the resistor R1, and a cathode of the unidirectional silicon controlled thyristor may be connected to the ground cable GND. A control grid of the unidirectional silicon controlled thyristor may be connected to the control end n of the second power supply module 120.

In this way, when the display apparatus 20 needs to display an image, the control end n of the second power supply module 120 inputs a high-level signal to the control grid of the unidirectional silicon controlled thyristor, so as to control the unidirectional silicon controlled thyristor to turn on; and when the display apparatus 20 stops displaying the image, the control end n of the second power supply module 120 inputs a low-level signal to the control end of the unidirectional silicon controlled thyristor, or the control end of the second power supply module 120 does not output a level signal, so as to control the unidirectional silicon controlled thyristor to turn off.

Figure 7:
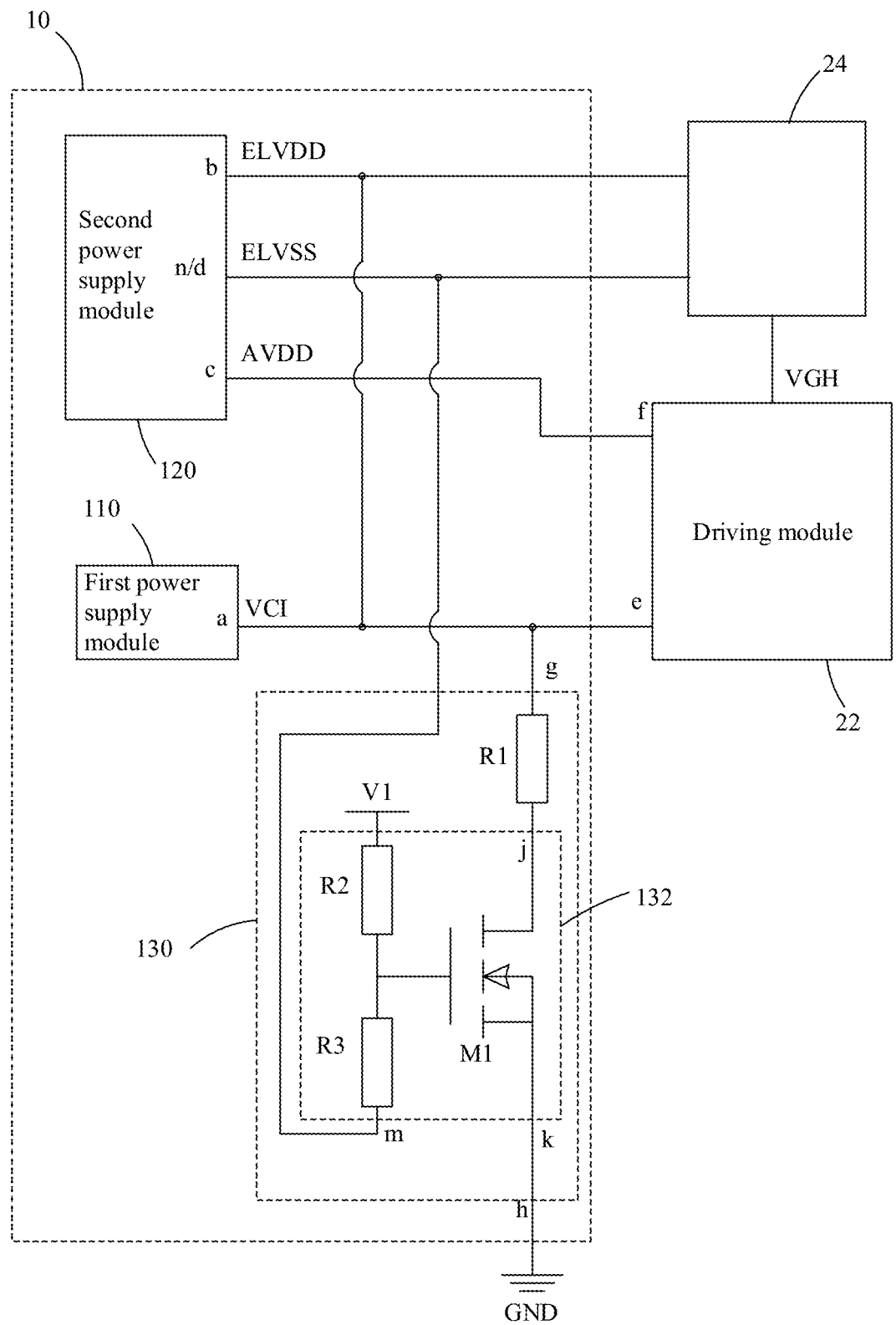
FIG. 7 is a schematic diagram of a structure of a fourth power supply circuit according to an embodiment of this application.

In a third possible structure, the switch unit 132 may be designed as: When the control end n of the second power supply module 120 outputs the voltage signal, the switch unit 132 turns off. When the control end n of the second power supply module 120 does not output the voltage signal, the switch unit 132 turns on. For example, as shown in FIG. 7, the switch unit 132 includes a transistor M1, a resistor R2, and a resistor R3. A first end (drain) of the transistor M1 is connected to a second end of the resistor R1, and a second end (source) of the transistor M1 is connected to a ground cable GND. A first end of the resistor R2 is connected to a power supply V1, and a second end of the resistor R2 is connected to a control end (gate) of the transistor M1. The power supply V1 herein may be a common power supply of the display apparatus 20 to which the power supply circuit 10 is applied, and a voltage of the power supply V1 is higher than a turn-on voltage of the transistor M1. A first end of the resistor R3 is connected to the second end of the resistor R2, and a second end of the resistor R3 is connected to the control end n of the second power supply module 120. The control end n of the second power supply module 120 may output a negative voltage signal, so that when the control end n of the second power supply module 120 outputs a voltage signal, the transistor M1 turns off, and when the control end n of the second power supply module 120 does not output a voltage signal, the transistor M1 turns on.

In this way, when the display apparatus 20 needs to display an image, the control end n of the second power supply module 120 outputs the negative voltage signal, so as to control the transistor M1 to turn off; and when the display apparatus 20 stops displaying the image, the control end n of the second power supply module 120 stops outputting the negative voltage signal, and the transistor M1 turns on under an action of the power supply V1.

In some embodiments, the voltage signal output by the control end n of the second power supply module 120 is not only used to control the switch unit 132, but also used to drive the light emitting unit OLED in the display panel 24 to emit light. In other words, the control end n of the second power supply module 120 may be the third output end d of the second power supply module 120. In this way, when the display apparatus 20 needs to display the image, the third output end d of the second power supply module 120 outputs the fourth voltage signal ELVSS. Because the fourth voltage signal ELVSS is a negative voltage signal, the fourth voltage signal ELVSS pulls down a voltage at the control end of the transistor M1, so that the transistor M1 turns off. In this case, the resistor R1 is disconnected from the ground cable GND, so as to prevent a voltage signal that is input to the first input end e of the driving module 22 from flowing into the ground cable GND through the resistor R1, thereby avoiding unnecessary power waste.

When the display apparatus 20 does not need to display the image, the second power supply module 120 no longer outputs the fourth voltage signal ELVSS. The voltage of the power supply V1 is input to the control end of the transistor M1 through the resistor R2, so that the transistor M1 turns on. In this case, the resistor R1 is connected to the ground cable GND, so that a residual voltage signal in the conducting wire connected to the first input end e of the driving module 22 can be quickly released to the ground cable GND through the resistor R1 and the transistor M1. In the power supply circuit 10, the switch unit 132 is connected to the power supply V1 and the third output end d of the second power supply module 120, and the fourth voltage signal ELVSS output by the third output end d of the second power supply module 120 when the display apparatus 20 displays the image is used to turn off the switch unit 132 when the display apparatus 20 needs to display the image, and to turn on the switch unit 132 when the display apparatus 20 does not need to display the image. In this way, a layout area of the power supply circuit 10 is not excessively increased, thereby facilitating cost control of the power supply circuit 10.

Embodiment 3

When the display apparatus 20 needs to display an image, the first power supply module 110 first starts to work, and the output end a of the first power supply module 110 outputs the first voltage signal VCI. The first voltage signal VCI is used to trigger the second power supply module 120 to work. Therefore, before the second power supply module 120 starts to work, because the output end a of the first power supply module 110 is connected to the first output end b of the second power supply module 120, the first voltage signal VCI may flow back to the first output end b of the second power supply module 120. Similarly, after the second power supply module 120 starts to work, because a voltage of the second voltage signal ELVDD is higher than a voltage of the first voltage signal VCI, the second voltage signal ELVDD may flow back to the output end a of the first power supply module 110. "Flowing back" means that a voltage signal is input from an output end of a power supply module to inside of the power supply module.

To prevent the voltage signal from flowing back, the power supply circuit 10 may further include a unidirectional module.

The unidirectional module is a unidirectional circuit, which is different from a bidirectional circuit. The bidirectional circuit may be, for example, a conducting wire. When a voltage at a first end of the bidirectional circuit is higher than a voltage at a second end of the bidirectional circuit, a voltage signal flows from the first end of the bidirectional circuit to the second end of the bidirectional circuit; or when the voltage at the first end of the bidirectional circuit is lower than the voltage at the second end, the voltage signal flows from the second end of the bidirectional circuit to the first end of the bidirectional circuit. The voltage signal in the unidirectional module can only flow from the first end of the unidirectional module to the second end of the unidirectional module. For ease of description, the first end of the unidirectional module is referred to as an input end of the unidirectional module, and the second end of the unidirectional module is referred to as an output end of the unidirectional module.

Figure 8:
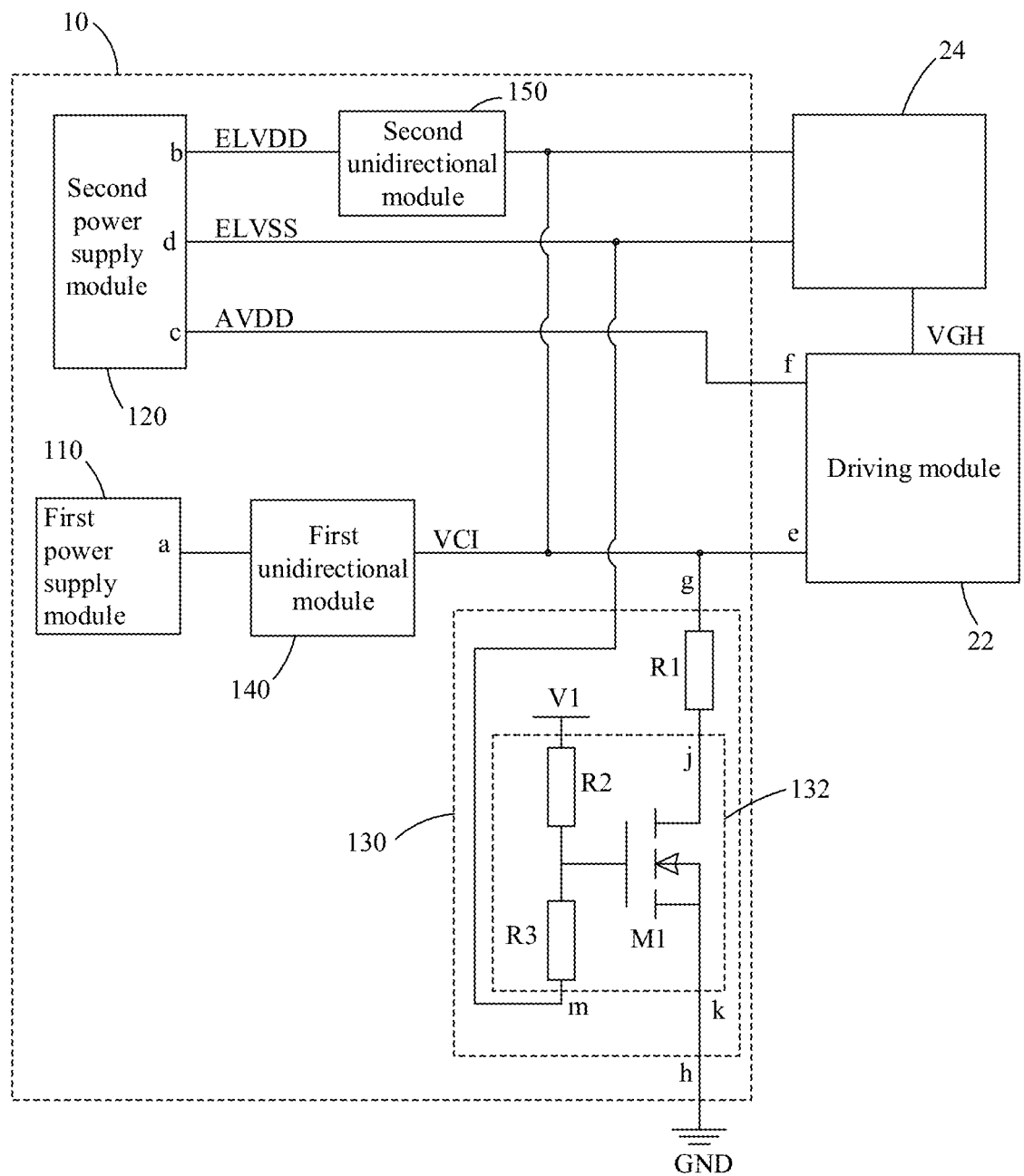
FIG. 8 is a schematic diagram of a structure of a fifth power supply circuit according to an embodiment of this application.

In some embodiments, as shown in FIG. 8, the power supply circuit 10 further includes a first unidirectional module 140.

The input end of the first unidirectional module 140 is connected to the output end a of the first power supply module 110, and the output end of the first unidirectional module 140 is connected to the first output end b of the second power supply module 120. In this way, after the output end a of the first power supply module 110 starts to output the first voltage signal VCI, and before the first output end b of the second power supply module 120 starts to output the second voltage signal ELVDD, a voltage at the input end of the first unidirectional module 140 is higher than the voltage at the output end of the first unidirectional module 140, and the first unidirectional module 140 turns on, so that the output end a of the first power supply module 110 inputs the first voltage signal VCI to the first input end e of the driving module 22. After the first output end b of the second power supply module 120 starts to output the second voltage signal ELVDD, the voltage at the input end of the first unidirectional module 140 is lower than the voltage at the output end of the first unidirectional module 140, and the first unidirectional module 140 is cut off. In this case, the first unidirectional module 140 can prevent the second voltage signal ELVDD from flowing back to the output end a of the first power supply module 110 to damage the first power supply module 110.

In some other embodiments, as shown in FIG. 8, the power supply circuit 10 further includes a second unidirectional module 150. An input end of the second unidirectional module 150 is connected to the first output end b of the second power supply module 120, and an output end of the second unidirectional module 150 is connected to the output end a of the first power supply module 110. In this way, after the output end a of the first power supply module 110 starts to output the first voltage signal VCI, and before the first output end b of the second power supply module 120 starts to output the second voltage signal ELVDD, a voltage at the input end of the second unidirectional module 150 is lower than a voltage at the output end of the second unidirectional module 150, and the second unidirectional module 150 is cut off. In this case, the second unidirectional module 150 can prevent the first voltage signal VCI from flowing back to the first output end b of the second power supply module 120, thereby avoiding damage to the second power supply module 120.

In some other embodiments, as shown in FIG. 8, when the power supply circuit 10 includes both the first unidirectional module 140 and the second unidirectional module 150, the input end of the first unidirectional module 140 is connected to the output end a of the first power supply module 110, and the output end of the first unidirectional module 140 is connected to a first output end of the second unidirectional module 150 and is connected to the first input end e of the driving module 22. An input end of the second unidirectional module 150 is connected to the first output end b of the second power supply module 120.

With reference to a specific embodiment, the following describes a plurality of different implementations of the first unidirectional module 140 and the second unidirectional module 150.

Figure 9:
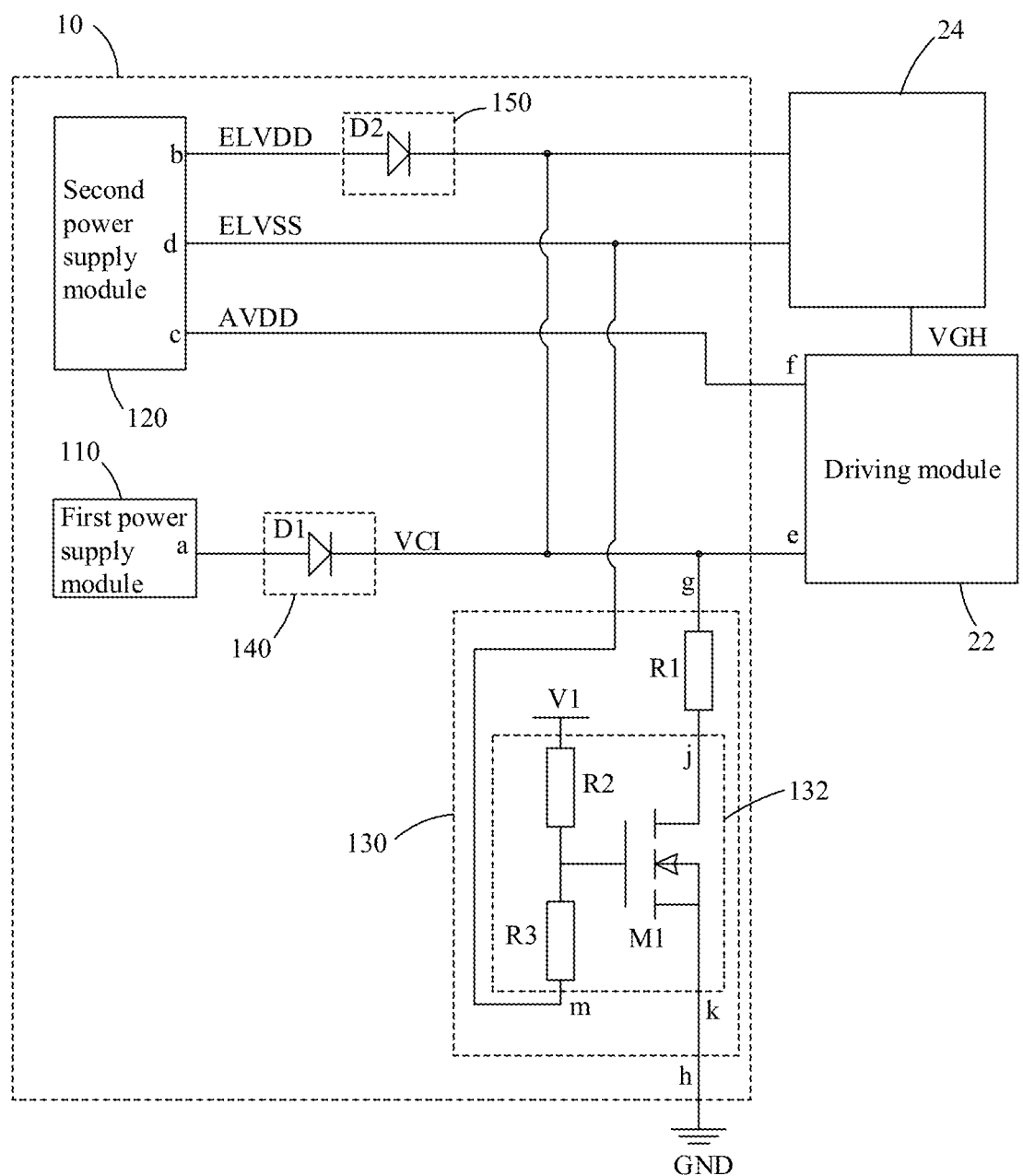
FIG. 9 is a schematic diagram of a structure of a sixth power supply circuit according to an embodiment of this application.

In a first possible implementation, as shown in FIG. 9, the first unidirectional module 140 includes a diode D1, and the second unidirectional module 150 includes a diode D2. An anode of the diode D1 is connected to an output end a of the first power supply module 110, and a cathode of the diode D1 is configured to be connected to the first input end e of the driving module 22. An anode of the diode D2 is connected to the first output end b of the second power supply module 120, and a cathode of the diode D2 is configured to be connected to the first input end e of the driving module 22.

The diode has functions of forward conduction and reverse cut-off. In this way, the diode D2 is used to form the second unidirectional module 150, so that the first voltage signal VCI can be prevented from flowing back to the first output end b of the second power supply module 120; and the diode D1 is used to form the first unidirectional module 140, so that the second voltage signal ELVDD can be prevented from flowing back to the output end a of the first power supply module 110. In addition, because of a low cost and a simple connection manner of the diode, the layout area of the power supply circuit 10 is not excessively increased, thereby facilitating cost control of the power supply circuit 10.

Figure 10:
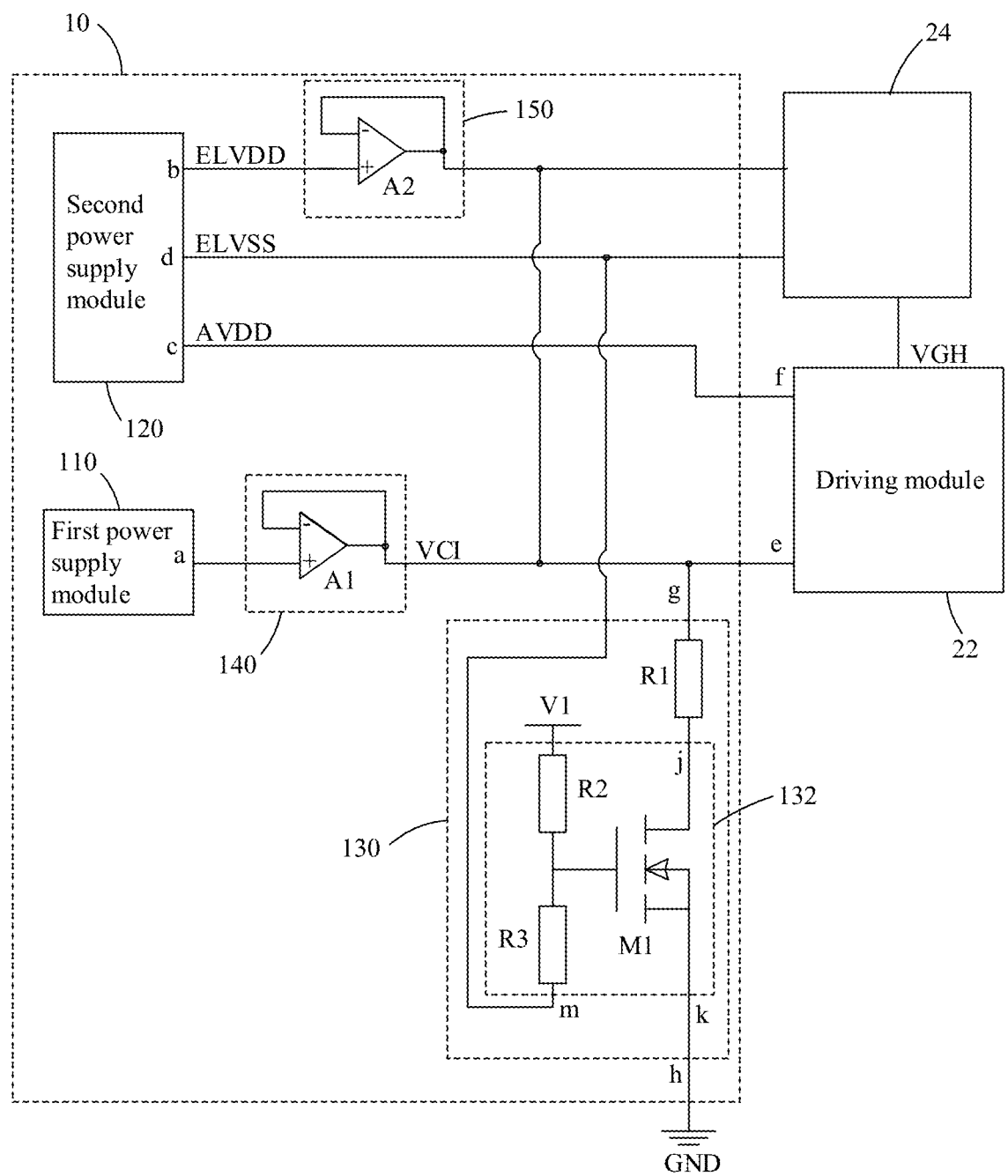
FIG. 10 is a schematic diagram of a structure of a seventh power supply circuit according to an embodiment of this application.

In a second possible implementation, as shown in FIG. 10, the first unidirectional module 140 includes an operational amplifier A1, and the second unidirectional module 150 includes an operational amplifier A2. The operational amplifier includes an in-phase input end, an inverting input end, and an output end. The in-phase input end of the operational amplifier A1 is connected to the output end a of the first power supply module 110, and both the inverting input end of the operational amplifier A1 and the output end of the operational amplifier A1 are configured to be connected to the first input end e of the driving module 22. The in-phase input end of the operational amplifier A2 is connected to the first output end b of the second power supply module 120, and both the inverting input end of the operational amplifier A2 and the output end of the operational amplifier A2 are configured to be connected to the first input end e of the driving module 22.

In this way, the operational amplifier A2 is used to form the second unidirectional module 150, so that the first voltage signal VCI can be prevented from flowing back to the first output end b of the second power supply module 120; and the operational amplifier A1 is used to form the first unidirectional module 140, so that the second voltage signal ELVDD can be prevented from flowing back to the output end a of the first power supply module 110.

Figure 11:
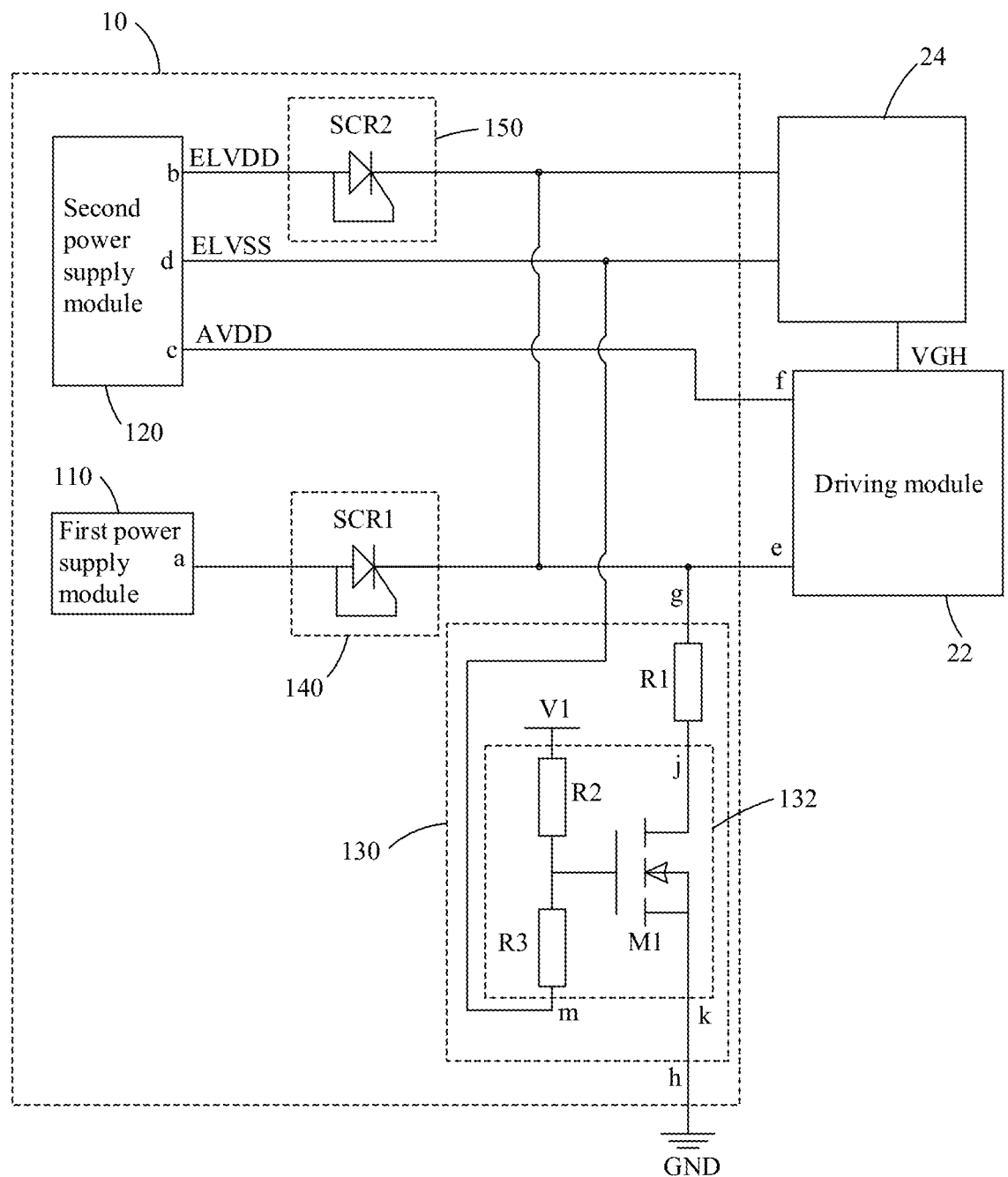
FIG. 11 is a schematic diagram of a structure of an eighth power supply circuit according to an embodiment of this application.

In a third possible implementation, as shown in FIG. 11, the first unidirectional module 140 includes a unidirectional silicon controlled thyristor SCR1, and the second unidirectional module 150 includes a unidirectional silicon controlled thyristor SCR2. A unidirectional silicon controlled thyristor includes an anode, a cathode, and a control grid. Both the anode and the control grid of the unidirectional silicon controlled thyristor SCR1 are connected to the output end a of the first power supply module 110, and the cathode of the unidirectional silicon controlled thyristor SCR1 is configured to be connected to the first input end e of the driving module 22. Both the anode and the control grid of the unidirectional silicon controlled thyristor SCR2 are connected to the first output end b of the second power supply module 120, and the cathode of the unidirectional silicon controlled thyristor SCR2 is configured to be connected to the first input end e of the driving module 22.

In this way, the unidirectional silicon controlled thyristor SCR2 is used to form the second unidirectional module 150, so that the first voltage signal VCI can be prevented from flowing back to the first output end b of the second power supply module 120; and the unidirectional silicon controlled thyristor SCR1 is used to form the first unidirectional module 140, so that the second voltage signal ELVDD can be prevented from flowing back to the output end a of the first power supply module 110.

Embodiment 4

The following describes a working process of the power supply circuit 10.

Figure 12:
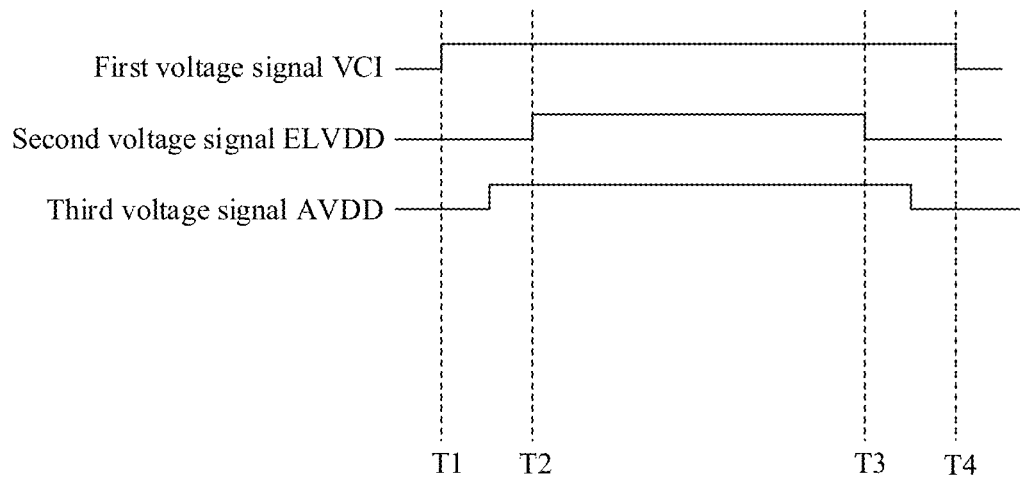
FIG. 12 is a sequence diagram of outputting a voltage signal by a first power supply circuit according to an embodiment of this application.

FIG. 12 is a sequence diagram of outputting a voltage signal by a power supply circuit 10 according to this embodiment of this application. As shown in FIG. 12, a time sequence of outputting a voltage signal by the power supply circuit 10 includes:

The output end a of the first power supply module 110 starts to output the first voltage signal VCI at the moment T1. The second output end c of the second power supply module 120 starts to output the third voltage signal AVDD after the moment T1 and before the moment T2. The first output end b of the second power supply module 120 starts to output the second voltage signal ELVDD at the moment T2. The first output end b of the second power supply module 120 stops outputting the second voltage signal ELVDD at the moment T3. The second output end c of the second power supply module 120 stops outputting the third voltage signal AVDD after the moment T3 and before the moment T4. The output end a of the first power supply module 110 stops outputting the first voltage signal VCI at the moment T4.

A period from the moment T1 to the moment T3 is a power-on period of the display panel 24 of the display apparatus 20. In this process, the display apparatus 20 switches from a screen-off state to a state of displaying an image. A period after the moment T3 is a power-off period of the display panel 24 of the display apparatus 20. In this process, the display apparatus 20 switches from the state of displaying an image to the screen-off state. Specifically, a working process of the power supply circuit 10 is as follows:

When the display apparatus 20 receives an instruction for displaying an image in the screen-off state, at the moment T1, the display apparatus 20 prepares to display the image, and the output end a of the first power supply module 110 starts to output the first voltage signal VCI. The first voltage signal VCI is input to the first input end e of the driving module 22 through the first unidirectional module 140. After receiving the first voltage signal VCI, the driving module 22 triggers the second power supply module 120 to work. When the second power supply module 120 works, after the moment T1 and before the moment T2, the second output end c of the second power supply module 120 starts to output the third voltage signal AVDD. The third voltage signal AVDD is output to the second input end f of the driving module 22. At the moment T2, the display apparatus 20 starts to display an image, and the first output end b of the second power supply module 120 starts to output the second voltage signal ELVDD. The second voltage signal ELVDD is input to the first input end e of the driving module 22 by using the second unidirectional module 150. In this case, the second voltage signal ELVDD is input to the first input end e of the driving module 22 inputs, and the third voltage signal AVDD is input to the second input end f of the driving module 22. The driving module 22 may generate the gate turn-on signal VGH based on the second voltage signal ELVDD input to the first input end e of the driving module 22 and the third voltage signal AVDD input to the second input end f of the driving module 22, so as to drive the switching transistor TFT1 in the display panel 24 to turn on.

When the display apparatus 20 receives the screen-off instruction in the state of displaying an image, at the moment T3, the display apparatus 20 starts to turn off the screen, and the first output end b of the second power supply module 120 stops outputting the second voltage signal ELVDD. After the moment T3 and before the moment T4, the second output end v of the second power supply module 120 stops outputting the third voltage signal AVDD. At the moment T4, the output end a of the first power supply module 110 stops outputting the first voltage signal VCI.

In the process of displaying an image by the display apparatus 20, that is, between the moment T2 and the moment T3, the driving module 22 generates the gate turn-on signal VGH based on the second voltage signal ELVDD and the third voltage signal AVDD. In this way, a voltage of the gate turn-on signal VGH may be increased, so that a voltage of the gate turn-on signal VGH meets a high refresh frequency requirement of the display panel 24.

Figure 13:
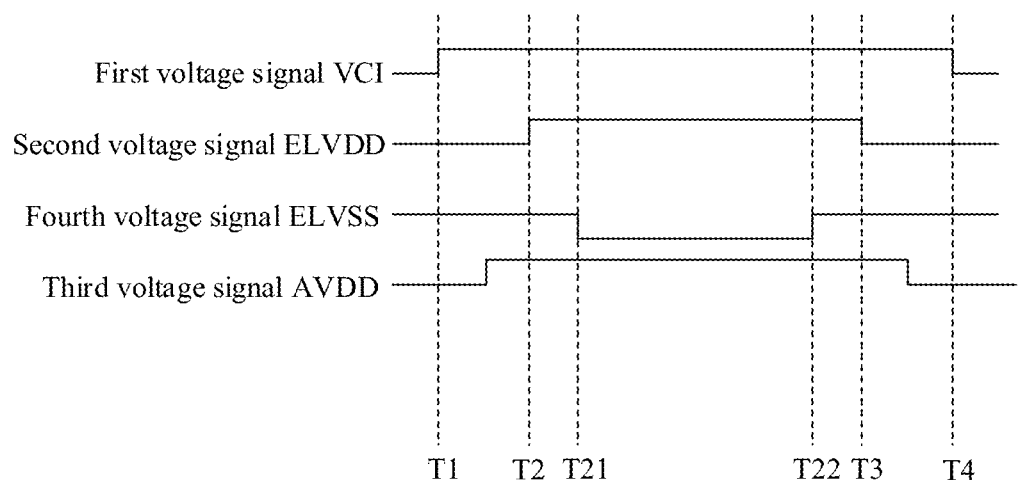
FIG. 13 is a sequence diagram of outputting a voltage signal by a second power supply circuit according to an embodiment of this application.

In some embodiments, as shown in FIG. 13, the first power supply module 110 starts to output the first voltage signal VCI at the moment T1. The second power supply module 120 starts to output the third voltage signal AVDD after the moment T1 and before the moment T2. The second power supply module 120 starts to output the second voltage signal ELVDD at the moment T2. The second power supply module 120 starts to output the fourth voltage signal ELVSS at a moment T21. The fourth voltage signal ELVSS is used to drive the light emitting unit OLED in the display panel 24 to emit light. The second power supply module 120 stops outputting the fourth voltage signal ELVSS at a moment T22. The second power supply module 120 stops outputting the second voltage signal ELVDD at the moment T3. The second power supply module 120 stops outputting the third voltage signal AVDD after the moment T3 and before the moment T4. The first power supply module 110 stops outputting the first voltage signal VCI at the moment T4. The T21 moment and the moment T2 are a same moment, or the T21 moment is after the moment T2 and before the moment T3. The T22 moment and the moment T3 are a same moment, or the T22 moment is after the T21 moment and before the moment T3.

Using that "the T21 moment and the moment T2 are a same moment, and the T22 moment and the moment T3 are a same moment" as an example, in this case, the period from the moment T1 to the moment T3 is the power-on period of the display panel 24 of the display apparatus 20. In this process, the display apparatus 20 switches from a screen-off state to a state of displaying an image. A period after the moment T3 is a power-off period of the display panel 24 of the display apparatus 20. In this process, the display apparatus 20 switches from the state of displaying an image to the screen-off state. The following describes a working process of the power supply circuit 10 in detail.

When the display apparatus 20 receives an instruction for displaying an image in the screen-off state, at the moment T1, the display apparatus 20 prepares to display the image, and the output end a of the first power supply module 110 starts to output the first voltage signal VCI. The first voltage signal VCI is input to the first input end e of the driving module 22 through the first unidirectional module 140. In addition, because the second power supply module 120 has not started to output the fourth voltage signal ELVSS, and the transistor M1 turns on, and the first voltage signal VCI is also output to the ground cable GND through the resistor R1 and the transistor M1. After receiving the first voltage signal VCI, the driving module 22 triggers the second power supply module 120 to work. When the second power supply module 120 works, after the moment T1 and before the moment T2, the second output end c of the second power supply module 120 starts to output the third voltage signal AVDD. The third voltage signal AVDD is output to the second input end f of the driving module 22. At the moment T2, the display apparatus 20 starts to display an image, the first output end b of the second power supply module 120 starts to output the second voltage signal ELVDD, and the third output end d of the second power supply module 120 starts to output the fourth voltage signal ELVSS. The second voltage signal ELVDD is input to the first input end e of the driving module 22 by using the second unidirectional module 150. In this case, the second voltage signal ELVDD is input to the first input end e of the driving module 22 inputs, and the third voltage signal AVDD is input to the second input end f of the driving module 22. The driving module 22 may generate the gate turn-on signal VGH based on the second voltage signal ELVDD input to the first input end e of the driving module 22 and the third voltage signal AVDD input to the second input end f of the driving module 22, so as to drive the switching transistor TFT1 in the display panel 24 to turn on. In addition, the fourth voltage signal ELVSS controls the transistor M1 to turn off, so as to prevent the second voltage signal ELVDD from being input to the ground cable GND through the resistor R1 and the transistor M1, thereby avoiding power waste.

When the display apparatus 20 receives the screen-off instruction in the state of displaying an image, at the moment T3, the display apparatus 20 starts to turn off the screen, the first output end b of the second power supply module 120 stops outputting the second voltage signal ELVDD, and the third output end d of the second power supply module 120 stops outputting the fourth voltage signal ELVSS. In this case, the transistor M1 turns on, and the first voltage signal VCI output by the first power supply module 110 is input to the first input end e of the driving module 22 through the first unidirectional module 140, and is also output to the ground cable GND through the resistor R1 and the transistor M1. After the moment T3 and before the moment T4, the second output end c of the second power supply module 120 stops outputting the third voltage signal AVDD. At the moment T4, the output end a of the first power supply module 110 stops outputting the first voltage signal VCI. In this case, a residual voltage signal in the conducting wire connected to the first input end e of the driving module 22 is quickly released to the ground cable GND through the resistor R1 and the transistor M1, thereby shortening a screen-off delay of the display apparatus 20.

Using that "the T21 moment is after the moment T2 and before the moment T3, the T22 moment is after the T21 moment and before the moment T3" as an example, in this case, the period from the moment T1 to the T22 moment is the power-on period of the display panel 24 of the display apparatus 20. In this process, the display apparatus 20 switches from a screen-off state to a state of displaying an image. The period after the T22 moment is the power-off period of the display panel 24 of the display apparatus 20 to which the power supply circuit 10 is applied. In this process, the display apparatus 20 switches from a state of displaying an image to a screen-off state. FIG. 14 to FIG. 19 are partial current flow diagrams of the power supply circuit 10 in a working process of the display apparatus 20. The following describes the working process of the power supply circuit 10 in detail with reference to FIG. 14 to FIG. 19.

Figure 14:
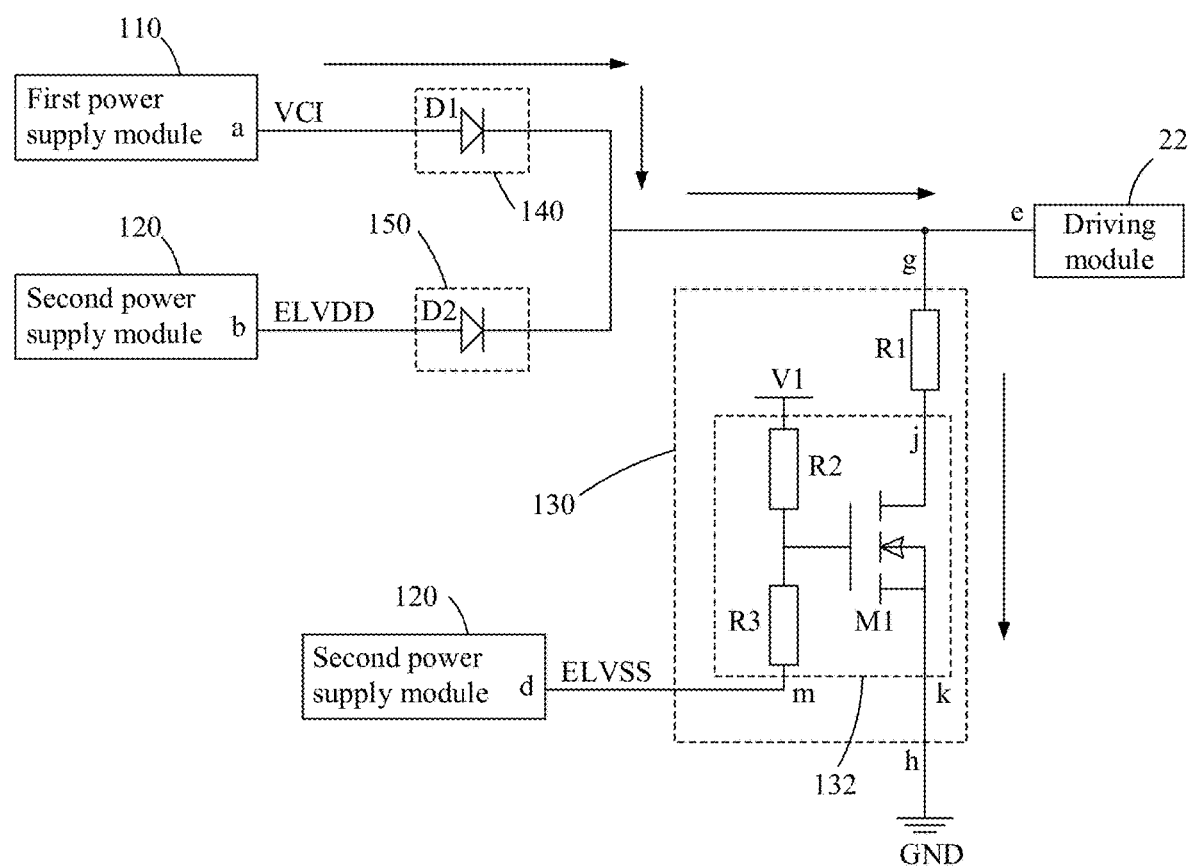
FIG. 14 is a partial current flow diagram of a first power supply circuit according to an embodiment of this application.
Figure 15:
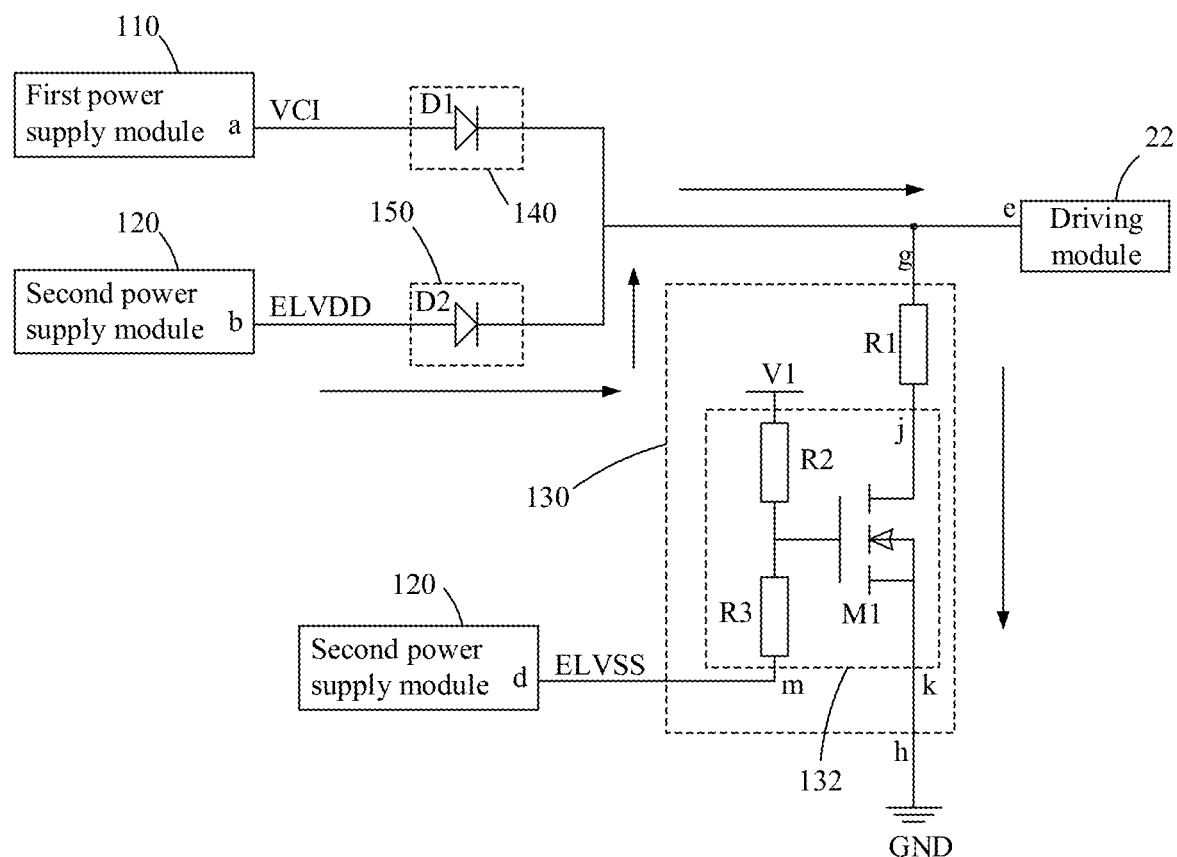
FIG. 15 is a partial current flow diagram of a second power supply circuit according to an embodiment of this application.
Figure 16:
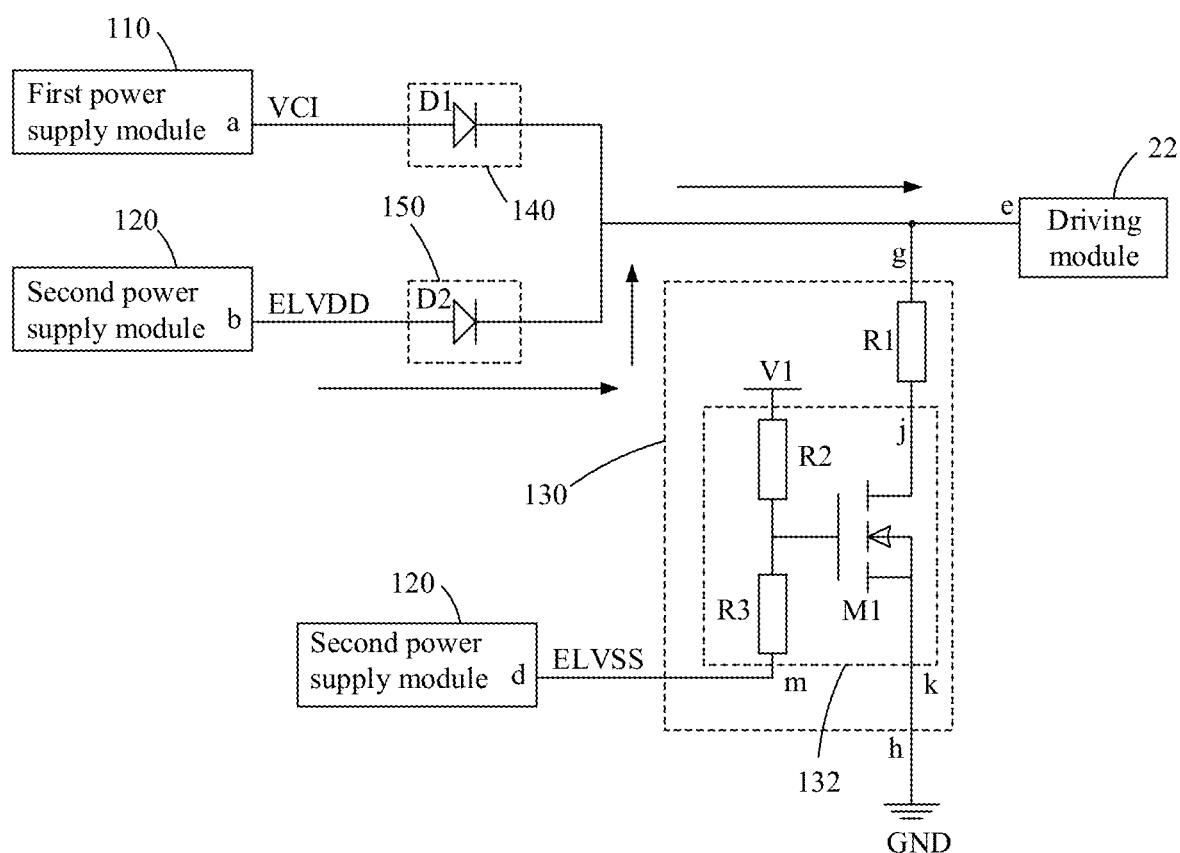
FIG. 16 is a partial current flow diagram of a third power supply circuit according to an embodiment of this application.

When the display apparatus 20 receives an instruction for displaying an image in the off-screen state, at the moment T1, the display apparatus 20 prepares to display the image, as shown in FIG. 14, and the output end a of the first power supply module 110 starts to output the first voltage signal VCI. The first voltage signal VCI is input to the first input end e of the driving module 22 through the first unidirectional module 140. In addition, because the second power supply module 120 has not started to output the fourth voltage signal ELVSS, and the transistor M1 turns on, and the first voltage signal VCI is also output to the ground cable GND through the resistor R1 and the transistor M1. After receiving the first voltage signal VCI, the driving module 22 triggers the second power supply module 120 to work. When the second power supply module 120 works, after the moment T1 and before the moment T2, the second output end c of the second power supply module 120 starts to output the third voltage signal AVDD. The third voltage signal AVDD is output to the second input end f of the driving module 22. At the moment T2, as shown in FIG. 15, the first output end b of the second power supply module 120 starts to output the second voltage signal ELVDD. The second voltage signal ELVDD is input to the first input end e of the driving module 22 through the second unidirectional module 150, and the second voltage signal ELVDD is also output to the ground cable GND through the resistor R1 and the transistor M1. In this case, the second voltage signal ELVDD is input to the first input end e of the driving module 22 inputs, and the third voltage signal AVDD is input to the second input end f of the driving module 22. The driving module 22 may generate the gate turn-on signal VGH based on the second voltage signal ELVDD input to the first input end e of the driving module 22 and the third voltage signal AVDD input to the second input end f of the driving module 22, so as to drive the switching transistor TFT1 in the display panel 24 to turn on. At the moment T21, as shown in FIG. 16, the third output end d of the second power supply module 120 starts to output the fourth voltage signal ELVSS, and the display apparatus 20 starts to display an image. In addition, the fourth voltage signal ELVSS controls the transistor M1 to turn off, so as to prevent the second voltage signal ELVDD from being input to the ground cable GND through the resistor R1 and the transistor M1, thereby avoiding power waste.

Figure 17:
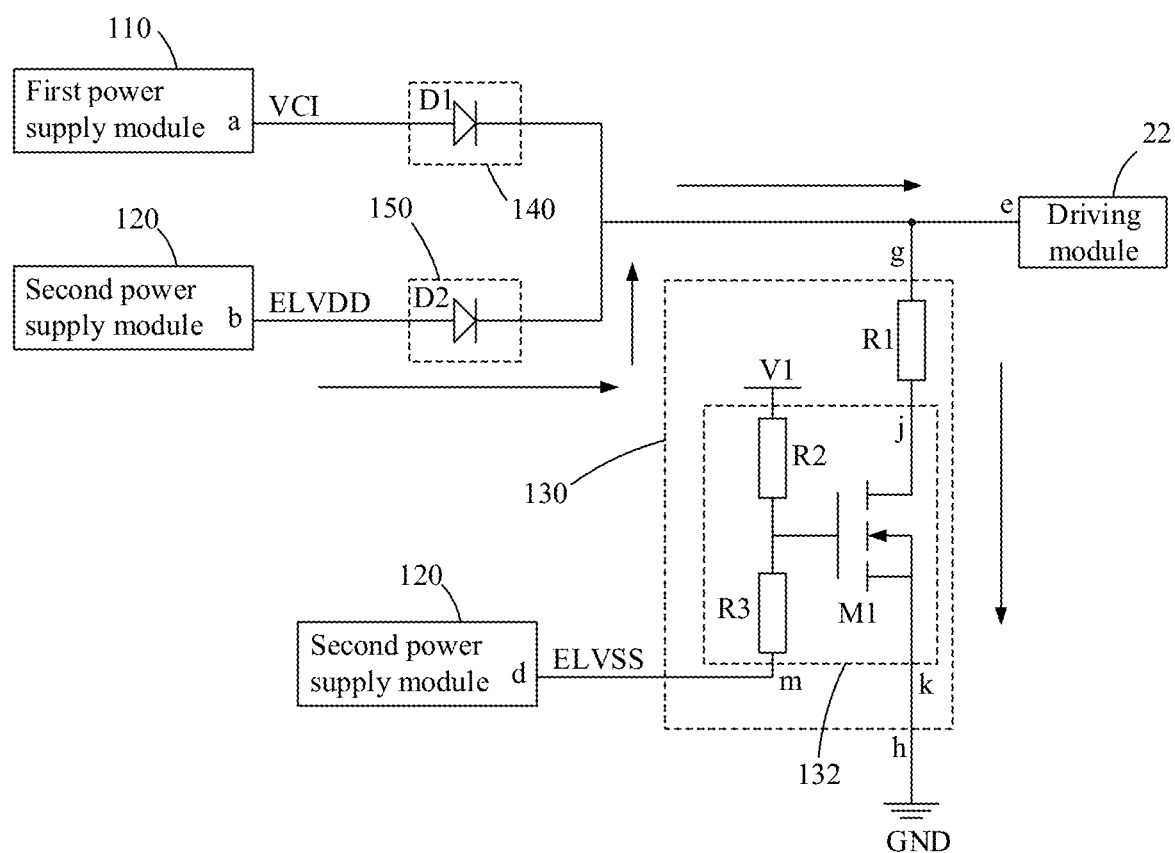
FIG. 17 is a partial current flow diagram of a fourth power supply circuit according to an embodiment of this application.
Figure 18:
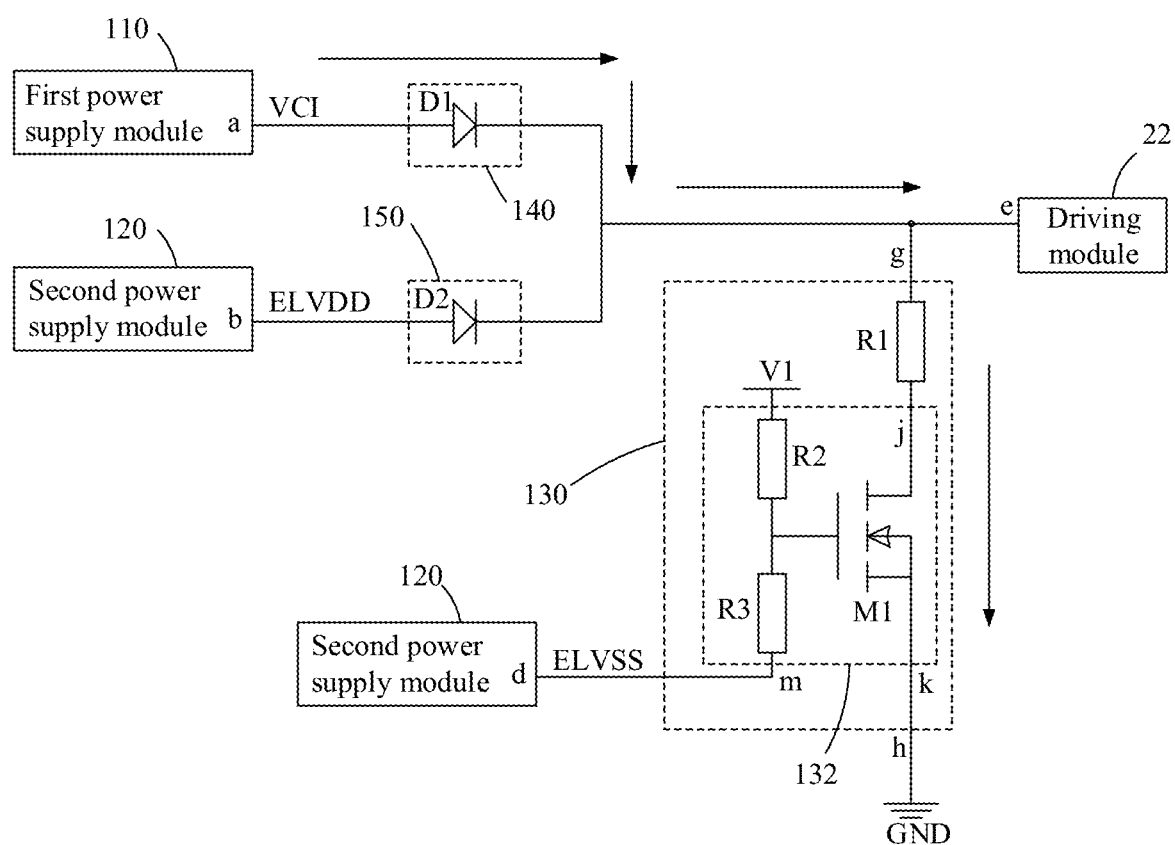
FIG. 18 is a partial current flow diagram of a fifth power supply circuit according to an embodiment of this application.
Figure 19:
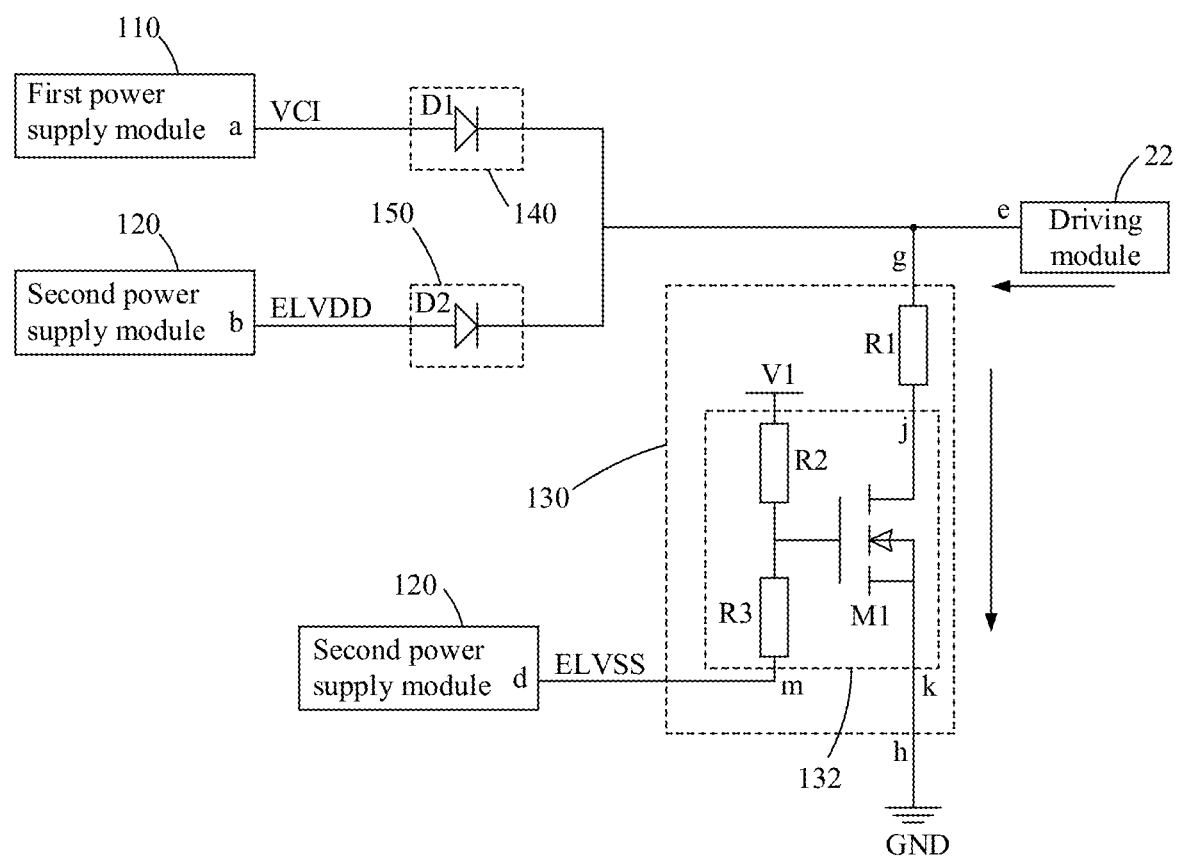
FIG. 19 is a partial current flow diagram of a sixth power supply circuit according to an embodiment of this application.

When the display apparatus 20 receives the screen-off instruction in the state of displaying an image, at the moment T22, as shown in FIG. 17, the display apparatus 20 starts to turn off the screen, and the third output end d of the second power supply module 120 stops outputting the fourth voltage signal ELVSS. In this case, the transistor M1 turns on, and the second voltage signal ELVDD output by the first output end b of the second power supply module 120 is input to the first input end e of the driving module 22, and is output to the ground cable GND through the resistor R1 and the transistor M1. At the moment T3, as shown in FIG. 18, the first output end b of the second power supply module 120 stops outputting the second voltage signal ELVDD, and the first voltage signal VCI output by the first power supply module 110 is input to the first input end e of the driving module 22 by using the first unidirectional module 140, and is also output to the ground cable GND through the resistor R1 and the transistor M1. After the moment T3 and before the moment T4, the second output end c of the second power supply module 120 stops outputting the third voltage signal AVDD. At the moment T4, as shown in FIG. 19, the output end a of the first power supply module 110 stops outputting the first voltage signal VCI. In this case, a residual voltage signal in the conducting wire connected to the first input end e of the driving module 22 is quickly released to the ground cable GND through the resistor R1 and the transistor M1, thereby shortening a screen-off delay of the display apparatus 20.

In the period from the T21 moment and the T22 moment in which the display apparatus 20 displays the image, the driving module 22 generates the gate turn-on signal VGH based on the second voltage signal ELVDD and the third voltage signal AVDD. In this way, a voltage of the gate turn-on signal VGH may be increased, so that a voltage of the gate turn-on signal VGH meets a high refresh frequency requirement of the display panel 24. In addition, when the display apparatus 20 displays the image in the period from the moment T21 to the moment T22, the display apparatus 20 controls the transistor M1 to turn off, thereby avoiding unnecessary power waste caused when the display apparatus 20 displays the image. After receiving the screen-off instruction, the display apparatus 20 controls the transistor M1 to turn on, and a residual voltage signal in a conducting wire connected to the first input end e of the driving module 22 after the moment T4 can be quickly released to the ground cable GND through the resistor R1 and the transistor M1, thereby shortening a screen-off delay of the display apparatus 20.

In this embodiment of this application, the power supply circuit 10 includes a first power supply module 110 and a second power supply module 120. The output end a of the first power supply module 110 is configured to output the first voltage signal VCI. The first output end b of the second power supply module 120 is configured to output the second voltage signal ELVDD. The output end a of the first power supply module 110 is connected to the first output end b of the second power supply module 120, and is configured to be connected to the first input end e of the driving module 22. The second output end c of the second power supply module 120 is configured to output the third voltage signal AVDD. The second output end c of the second power supply module 120 is configured to be connected to the second input end f of the driving module 22. When both the first power supply module 110 and the second power supply module 120 work, the voltage signals that are output by the output end a of the first power supply module 110, the first output end b of the second power supply module 120, and the second output end c are used to instruct the driving module 22 to generate the gate turn-on signal VGH. The gate turn-on signal VGH is used to drive the switching transistor TFT1 in the display panel 24 to turn on. In this way, because the voltage of the second voltage signal ELVDD output by the first output end b of the second power supply module 120 is higher than the voltage of the first voltage signal VCI output by the output end a of the first power supply module 110, the voltage signal input by the power supply circuit 10 to the first input end e of the driving module 22 is the second voltage signal ELVDD, and the driving module 22 generates the gate turn-on signal VGH based on the second voltage signal ELVDD and the third voltage signal AVDD. In this way, a voltage of the gate turn-on signal VGH generated by the driving module 22 is relatively high, which meets a high refresh frequency requirement of the display panel 24. In addition, in this embodiment of this application, the first output end b that is of the second power supply module 120 in the power supply circuit 10 and that is configured to output the second voltage signal ELVDD is connected to the output end a that is of the first power supply module 110 and that is configured to output the first voltage signal VCI, so that a voltage of the gate turn-on signal VGH can be increased, and a layout area of the power supply circuit 10 is not excessively increased, thereby facilitating cost control of the power supply circuit 10.

The power supply circuit 10 further includes a discharging module 130 configured to be connected between the output end a of the first power supply module 110/the first output end b of the second power supply module 120 and the ground cable GND. The discharging module 130 is configured to: when the first power supply module 110 and the second power supply module 120 stop outputting the voltage signals, quickly release a residual voltage signal in the conducting wire connected to the first input end e of the driving module 22 to the ground cable GND. In this way, a screen-off delay of the display apparatus 20 can be shortened. The discharging module 130 includes a switch unit 132, configured to control whether the resistor R1 in the discharging module 130 is connected to the ground cable GND. When the display apparatus 20 needs to display an image, the switch unit 132 turns off; and when the display apparatus 20 needs to turn off, the switch unit 132 is closed. In this way, the power supply circuit 10 may further avoid unnecessary power waste caused by the discharging module 130 when the display apparatus 20 needs to display an image. The control end of the transistor M1 in the switch unit 132 may be connected to the third output end d of the second power supply module 120, so that when the display apparatus 20 needs to display an image and the third output end d of the second power supply module 120 outputs the fourth level signal ELVSS, the transistor M1 in the switch unit 132 automatically turns off, that is, the switch unit 132 turns off. When the display apparatus 20 needs to turn off the screen and the third output end d of the second power supply module 120 stops outputting the fourth level signal ELVSS, the transistor M1 in the switch unit 132 automatically turns on, that is, the switch unit 132 turns on. In this way, a layout area of the power supply circuit 10 is not excessively increased, thereby facilitating cost control of the power supply circuit 10. The power supply circuit 10 further includes a first unidirectional module 140 and a second unidirectional module 150. The first unidirectional module 140 can prevent the second voltage signal ELVDD from flowing back to the output end a of the first power supply module 110 to damage the first power supply module 110, and the second unidirectional module 150 can prevent the first voltage signal VCI from flowing back to the first output end b of the second power supply module 120 to damage the second power supply module 120.

When the power supply circuit 10 in this embodiment of this application works, the voltage of the gate turn-on signal VGH generated by the driving module 22 is equal to a sum of the voltage of the second voltage signal ELVDD and the voltage of the third voltage signal AVDD, and is higher than a sum of the voltage of the first voltage signal VCI and the voltage of the third voltage signal AVDD, so that the voltage of the gate turn-on signal VGH meets the high refresh frequency requirement of the display panel 24. In the related art, there is also a technical solution in which the voltage of the gate turn-on signal VGH is equal to twice the voltage of AVDD. However, in the technical solution, the voltage of the gate turn-on signal VGH is excessively high, which causes power waste. When the power supply circuit 10 in this embodiment of this application works, the voltage of the gate turn-on signal VGH generated by the driving module 22 is lower than twice the voltage of the third voltage signal AVDD, thereby avoiding power waste, and increasing working duration of the display apparatus 20 to which the power supply circuit 10 is applied.

It can be understood that, in some embodiments, the first power supply module 110 and the second power supply module 110 may be integrated, that is, the first power supply module 110 and the second power supply module are integrated into the foregoing power supply circuit 10. In some other embodiments, the power supply circuit 10 and the driving module 22 connected to the power supply circuit 10 may be integrated. For example, the power supply circuit 10 and the driving module 22 may be integrated into a driving apparatus configured to drive the display panel 24. In some other embodiments, the power supply circuit 10, the driving module 22, and the display panel 24 are integrated into the display apparatus 20, and the display apparatus 20 may be a mobile phone, a tablet computer, a display, or the like.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application; and such modifications and replacements shall fall within the protection scope of this application.

What is claimed is:

1. A power supply circuit, comprising:
a first power supply module having an output end; and
a second power supply module having a first output end and a second output end, wherein the first output end is connected to the output end of the first power supply module,
wherein both the output end of the first power supply module and the first output end of the second power supply module are configured to be connected to a first input end of a driving module wherein the second output end of the second power supply module is configured to be connected to a second input end of the driving module,
wherein when the first power supply module works and the second power supply module sleeps, the output end of the first power supply module outputs a voltage signal to instruct the driving module to trigger the second power supply module to work, wherein when both the first power supply module and the second power supply module work, the output end of the first power supply module, the first output end of the second power supply module, and the second output end of the second power supply module all output voltage signals to instruct the driving module to generate a gate turn-on signal configured to drive a switching transistor in a display panel to turn on, and wherein a voltage of the voltage signal output by the output end of the first power supply module is less than a voltage of the voltage signal output by the first output end of the second power supply module.

2. The power supply circuit of claim 1, further comprising a discharging module having a first end connected to the output end of the first power supply module and the first output end of the second power supply module, and having a second end connected to a ground terminal (GND).

3. The power supply circuit of claim 2, wherein the discharging module comprises a resistor (R1) having a first end connected to the output end of the first power supply module and the first output end of the second power supply module, and having a second end connected to the ground terminal (GND).

4. The power supply circuit of claim 3, wherein the discharging module further comprises a switch unit comprising:
- a first end connected to the second end of the resistor (R1);
- a second end connected to the ground terminal (GND); and
- a control end connected to a control end of the second power supply module,
- wherein the switch unit turns off when the control end of the second power supply module outputs a voltage signal.

5. The power supply circuit of claim 4, wherein the switch unit comprises:
- a transistor (M1);
- a resistor (R2); and
- a resistor (R3),
- wherein a first end of the transistor (M1) is connected to the second end of the resistor (R1), and a second end of the transistor (M1) is connected to the ground terminal (GND),
- wherein a first end of the resistor (R2) is connected to a power supply (V1), and a second end of the resistor (R2) is connected to a control end of the transistor (M1),
- wherein a first end of the resistor (R3) is connected to the second end of the resistor (R2), a second end of the resistor (R3) is connected to the control end of the second power supply module, and
- wherein when the control end of the second power supply module outputs a voltage signal, the transistor (M1) turns off.

6. The power supply circuit of claim 4, wherein the voltage signal output by the control end of the second power supply module is configured to drive a light emitting unit in the display panel to emit light.

7. The power supply circuit of claim 1, further comprising a first unidirectional module having an input end connected to the output end of the first power supply module, and having an output end connected to the first output end of the second power supply module.

8. The power supply circuit of claim 7, wherein the first unidirectional module comprises a diode (D1) having an anode connected to the output end of the first power supply module, and having a cathode connected to the first output end of the second power supply module.

9. The power supply circuit of claim 7, wherein the first unidirectional module comprises an operational amplifier (A1) having an in-phase input end connected to the output end of the first power supply module, and having an inverting input end and an output end that are connected to the first output end of the second power supply module.

10. The power supply circuit of claim 7, wherein the first unidirectional module comprises a unidirectional silicon controlled thyristor (SCR1) having an anode and a control grid that are connected to the output end of the first power supply module, and having a cathode connected to the first output end of the second power supply module.

11. The power supply circuit of claim 1, wherein the power supply circuit further comprises a second unidirectional module having an input end connected to the first output end of the second power supply module, and having an output end connected to the output end of the first power supply module.

12. The power supply circuit of claim 1, wherein the output end of the first power supply module starts to output a voltage signal at a moment T1,
- wherein the second output end of the second power supply module starts to output a voltage signal after the moment T1 and before a moment T2,
- wherein the first output end of the second power supply module starts to output a voltage signal at the moment T2,
- wherein the first output end of the second power supply module stops outputting a voltage signal at a moment T3,
- wherein the second output end of the second power supply module stops outputting a voltage signal after the moment T3 and before a moment T4, and
- wherein the output end of the first power supply module stops outputting a voltage signal at the moment T4.

13. The power supply circuit of claim 12, wherein a third output end of the second power supply module starts to output a voltage signal at a moment T21, and the voltage signal output by the third output end of the second power supply module is configured to drive a light emitting unit in the display panel to emit light, and
- wherein the T21 moment and the moment T2 are a same moment, or the T21 moment is after the moment T2 and before the moment T3.

14. The power supply circuit of claim 13, wherein the third output end of the second power supply module stops outputting the voltage signal at a moment T22,
- wherein the T22 moment and the moment T3 are a same moment, or the T22 moment is after the T21 moment and before the moment T3.

15. A driving apparatus, comprising:
a power supply circuit, comprising:
- a first power supply module having an output end; and
- a second power supply module having a first output end and a second output end, wherein the first output end is connected to the output end of the first power supply module, and wherein a voltage of a voltage signal output by the output end of the first power supply module is less than a voltage of a voltage signal output by the first output end of the second power supply module; and a driving module having a first input end connected to both the output end of the first power supply module and the first output end of the second power supply module, and having a second input end connected to the second output end of the second power supply module, wherein the driving module is configured to:
trigger the second power supply module to work when a voltage signal is input to the first input end and no voltage signal is input to the second input end; and
generate a gate turn-on signal when voltage signals are input to both the first input end and the second input end, wherein the gate turn-on signal is based on the voltage signals input to both the first input end and the second input end, and wherein the gate turn-on signal is configured to drive a switching transistor in a display panel to turn on,
wherein when the first power supply module works and the second power supply module sleeps, the output end of the first power supply module outputs the voltage signal to instruct the driving module to trigger the second power supply module to work, and
wherein when both the first power supply module and the second power supply module work, the output end of the first power supply module, the first output end of the second power supply module, and the second output end of the second power supply module all output voltage signals to instruct the driving module to generate the gate turn-on signal.

16. A display apparatus, comprising:
a display panel;
a power supply circuit, comprising:
  a first power supply module having an output end; and
  a second power supply module having a first output end and a second output end, wherein the first output end is connected to the output end of the first power supply module, and wherein a voltage of a voltage signal output by the output end of the first power supply module is less than a voltage of a voltage signal output by the first output end of the second power supply module; and
a driving module having a first input end connected to both the output end of the first power supply module and the first output end of the second power supply module, and having a second input end connected to the second output end of the second power supply module, wherein the driving module is configured to:
  trigger the second power supply module to work when a voltage signal is input to the first input end and no voltage signal is input to the second input end; and
  generate a gate turn-on signal when voltage signals are input to both the first input end and the second input end, wherein the gate turn-on signal is based on the voltage signals input to both the first input end and the second input end, and wherein the gate turn-on signal is configured to drive a switching transistor in the display panel to turn on,
wherein when the first power supply module works and the second power supply module sleeps, the output end of the first power supply module outputs the voltage signal to instruct the driving module to trigger the second power supply module to work, and
wherein when both the first power supply module and the second power supply module work, the output end of the first power supply module, the first output end of the second power supply module, and the second output end of the second power supply module all output voltage signals to instruct the driving module to generate the gate turn-on signal.

17. The driving apparatus of claim 15, wherein the power supply circuit further comprises a discharging module having a first end connected to the output end of the first power supply module and the first output end of the second power supply module, and having a second end connected to a ground terminal (GND).

18. The driving apparatus of claim 15, wherein the power supply circuit further comprises a first unidirectional module having an input end connected to the output end of the first power supply module, and having an output end connected to the first output end of the second power supply module.

19. The driving apparatus of claim 15, wherein the power supply circuit further comprises a second unidirectional module having an input end connected to the first output end of the second power supply module, and having an output end connected to the output end of the first power supply module.

20. The display apparatus of claim 16, wherein the power supply circuit further comprises a discharging module having a first end connected to the output end of the first power supply module and the first output end of the second power supply module, and having a second end connected to a ground terminal (GND).

* * * * *

UNITED STATES PATENT AND TRADEMARK OFFICE
CERTIFICATE OF CORRECTION

| | | |
|---|---|---|
| PATENT NO. | : 12,307,958 B2 | Page 1 of 1 |
| APPLICATION NO. | : 17/792981 | |
| DATED | : May 20, 2025 | |
| INVENTOR(S) | : Bowen Li et al. | |

It is certified that error appears in the above-identified patent and that said Letters Patent is hereby corrected as shown below:

On the Title Page

Page 2, (56) References Cited, Foreign Patent Documents: "IN 106847200 A 6/2017" should read "CN 106847200 A 6/2017"

Page 2, (56) References Cited, Foreign Patent Documents: "IN 113436563 A 9/2021" should read "CN 113436563 A 9/2021"

Signed and Sealed this
Seventeenth Day of June, 2025

Coke Morgan Stewart
*Acting Director of the United States Patent and Trademark Office*